US012441109B2

(12) United States Patent
Masuda et al.

(10) Patent No.: US 12,441,109 B2
(45) Date of Patent: Oct. 14, 2025

(54) LIQUID DISCHARGE HEAD, LIQUID DISCHARGE DEVICE, AND LIQUID DISCHARGE APPARATUS

(71) Applicants: Toshiaki Masuda, Kanagawa (JP); Takuma Hirabayashi, Tokyo (JP)

(72) Inventors: Toshiaki Masuda, Kanagawa (JP); Takuma Hirabayashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 254 days.

(21) Appl. No.: 18/197,738

(22) Filed: May 16, 2023

(65) Prior Publication Data

US 2023/0398779 A1 Dec. 14, 2023

(30) Foreign Application Priority Data

Jun. 9, 2022 (JP) ................................ 2022-093814

(51) Int. Cl.
*B41J 2/14* (2006.01)

(52) U.S. Cl.
CPC ....... *B41J 2/14233* (2013.01); *B41J 2/14112* (2013.01); *B41J 2/14314* (2013.01); *B41J 2002/14258* (2013.01)

(58) Field of Classification Search
CPC ................ B41J 2/14233; B41J 2/14112; B41J 2/14314; B41J 2/14201; B41J 2002/14419; B41J 2002/14362; B41J 2002/14258; B41J 2202/20; B41J 2202/11; B41J 2202/12; B41J 2202/19; B41J 2/14274; B41J 2/14282; B41J 2/14298; B41J 2002/14225; B41J 2002/1425; B41J 2002/14266; B41J 2002/14306
See application file for complete search history.

(56) References Cited

U.S. PATENT DOCUMENTS

| | | | |
|---|---|---|---|
| 2014/0267509 | A1 | 9/2014 | Shinkai et al. |
| 2015/0022592 | A1 | 1/2015 | Aoyama et al. |
| 2015/0070444 | A1 | 3/2015 | Ishimori et al. |
| 2015/0171307 | A1 | 6/2015 | Masuda et al. |
| 2016/0001556 | A1 | 1/2016 | Masuda et al. |
| 2017/0100934 | A1 | 4/2017 | Masuda et al. |
| 2017/0253040 | A1 | 9/2017 | Shinkai et al. |

(Continued)

FOREIGN PATENT DOCUMENTS

| | | |
|---|---|---|
| JP | 2000-296616 | 10/2000 |
| JP | 2002-292871 | 10/2002 |

(Continued)

OTHER PUBLICATIONS

U.S. Appl. No. 17/972,880, filed Oct. 25, 2022, Yuu Sugioka, et al.
U.S. Appl. No. 17/964,963, filed Oct. 13, 2022, Toshiaki Masuda.

*Primary Examiner* — Kristal Feggins
(74) *Attorney, Agent, or Firm* — XSENSUS LLP

(57) ABSTRACT

A liquid discharge head includes: an actuator substrate; an electromechanical transducer held by the actuator substrate; a damper; and a damper holding substrate holding the damper, wherein the damper disposed between the actuator substrate and the damper holding substrate and joined to the actuator substrate and the damper holding substrate with an adhesive, the damper has a joint portion having a recess or a through hole.

17 Claims, 17 Drawing Sheets

(56) References Cited

U.S. PATENT DOCUMENTS

| | | | |
|---|---|---|---|
| 2018/0370237 A1 | 12/2018 | Mizukami et al. | |
| 2019/0044055 A1 | 2/2019 | Kondo et al. | |
| 2019/0270310 A1 | 9/2019 | Masuda et al. | |
| 2020/0298570 A1 | 9/2020 | Masuda et al. | |
| 2021/0039393 A1 | 2/2021 | Mizukami et al. | |
| 2021/0162759 A1 | 6/2021 | Miwa et al. | |
| 2021/0252862 A1 | 8/2021 | Masuda | |
| 2022/0097373 A1 | 3/2022 | Masuda | |
| 2022/0242123 A1 | 8/2022 | Hirabayashi et al. | |
| 2023/0021821 A1 | 1/2023 | Kuroda et al. | |
| 2023/0108462 A1 | 4/2023 | Masuda et al. | |
| 2023/0302796 A1* | 9/2023 | Yamazaki | B41J 2/161 |

FOREIGN PATENT DOCUMENTS

| | | |
|---|---|---|
| JP | 2004-188653 | 7/2004 |
| JP | 2006-212970 | 8/2006 |
| JP | 2016-016522 | 2/2016 |
| JP | 2017-132237 | 8/2017 |

* cited by examiner

COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-093814, filed on Jun. 9, 2022, in the Japan Patent Office, the entire disclosure of which is hereby incorporated by reference herein.

BACKGROUND

Technical Field

The present embodiment relates to a liquid discharge head, a liquid discharge device, and a liquid discharge apparatus.

Related Art

A liquid discharge head drives an electromechanical transducer held by an actuator substrate to discharge liquid in a pressure chamber from a nozzle.

SUMMARY

In an aspect of the present disclosure, a liquid discharge head includes: an actuator substrate; an electromechanical transducer held by the actuator substrate; a damper; and a damper holding substrate holding the damper, wherein the damper disposed between the actuator substrate and the damper holding substrate and joined to the actuator substrate and the damper holding substrate with an adhesive, the damper has a joint portion having a recess or a through hole.

In another aspect of the present disclosure, a liquid discharge head includes: an actuator substrate; an electromechanical transducer held by the actuator substrate; a damper; and a damper holding substrate holding the damper, wherein the damper disposed between the actuator substrate and the damper holding substrate and joined to the actuator substrate and the damper holding substrate with an adhesive, the actuator substrate includes a recess in a facing region facing the damper.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
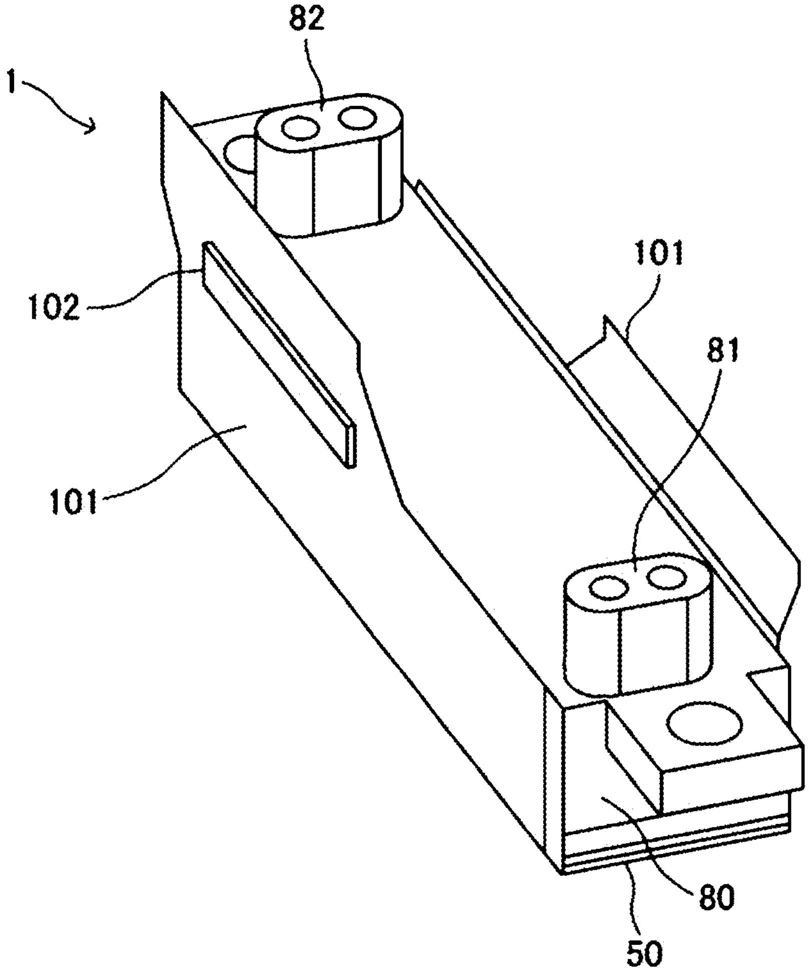
FIG. 1 is an external perspective explanatory view of a liquid discharge head according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a liquid discharge head installed in a liquid discharge apparatus according to the present embodiment.

FIG. 1 is an external perspective explanatory view of a liquid discharge head according to the present embodiment.

Figure 2:
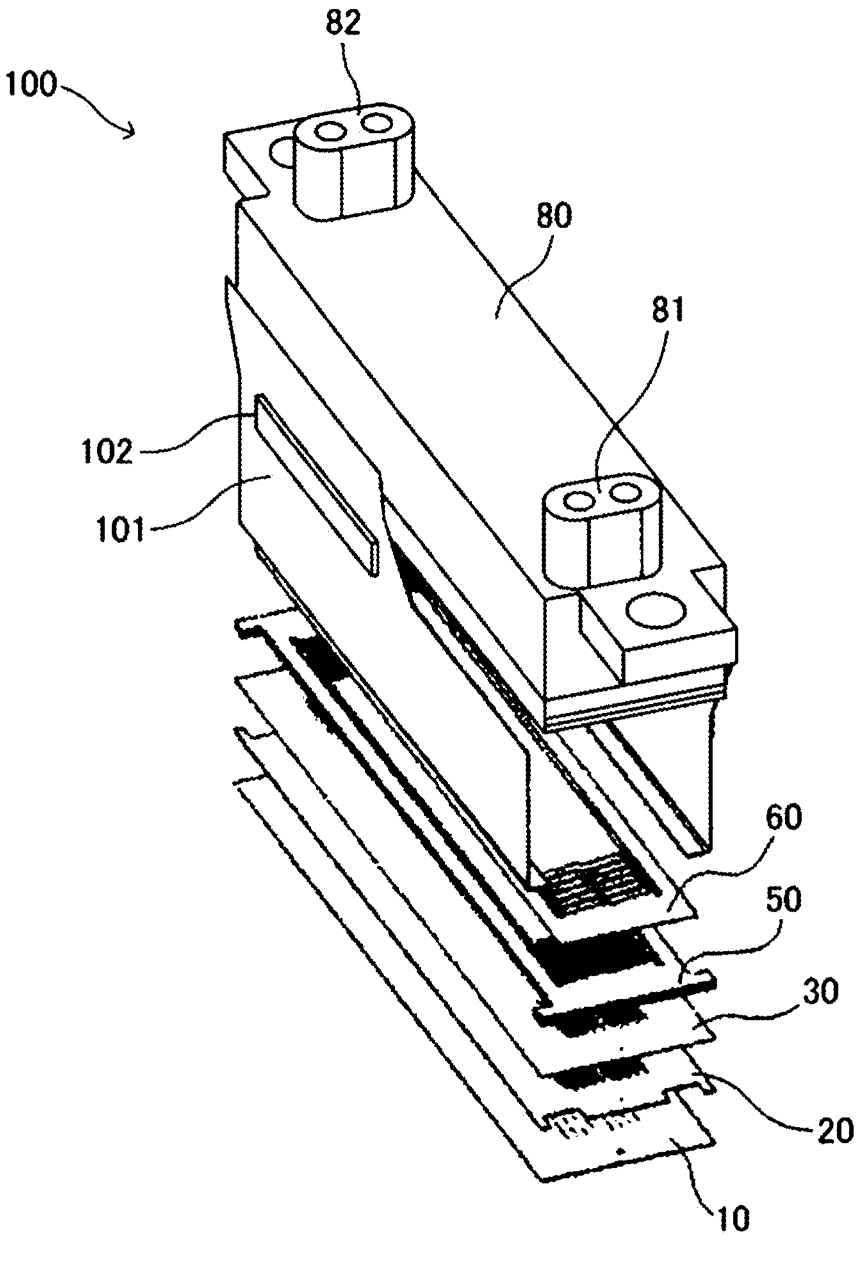
FIG. 2 is an exploded perspective explanatory view of the liquid discharge head.

FIG. 2 is an exploded perspective explanatory view of the liquid discharge head.

Figure 3:
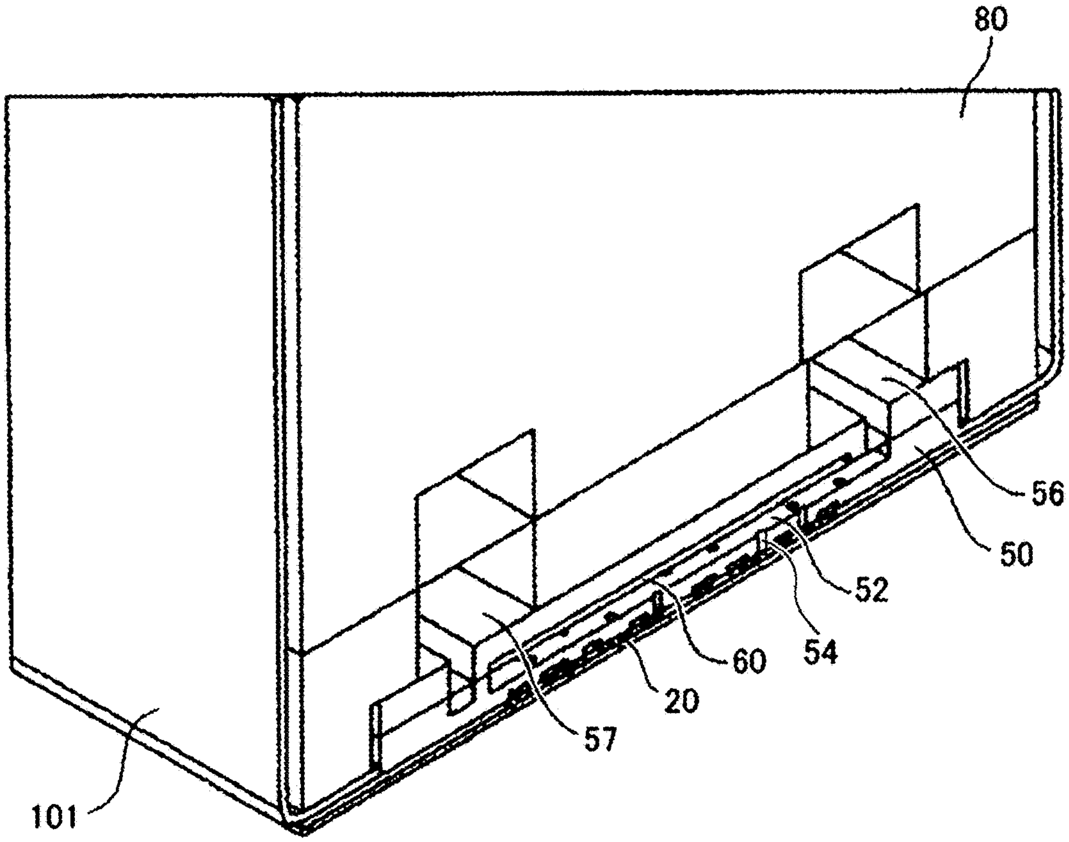
FIG. 3 is a cross-sectional perspective explanatory view of the liquid discharge head.

FIG. 3 is a cross-sectional perspective explanatory view of the liquid discharge head.

Figure 4:
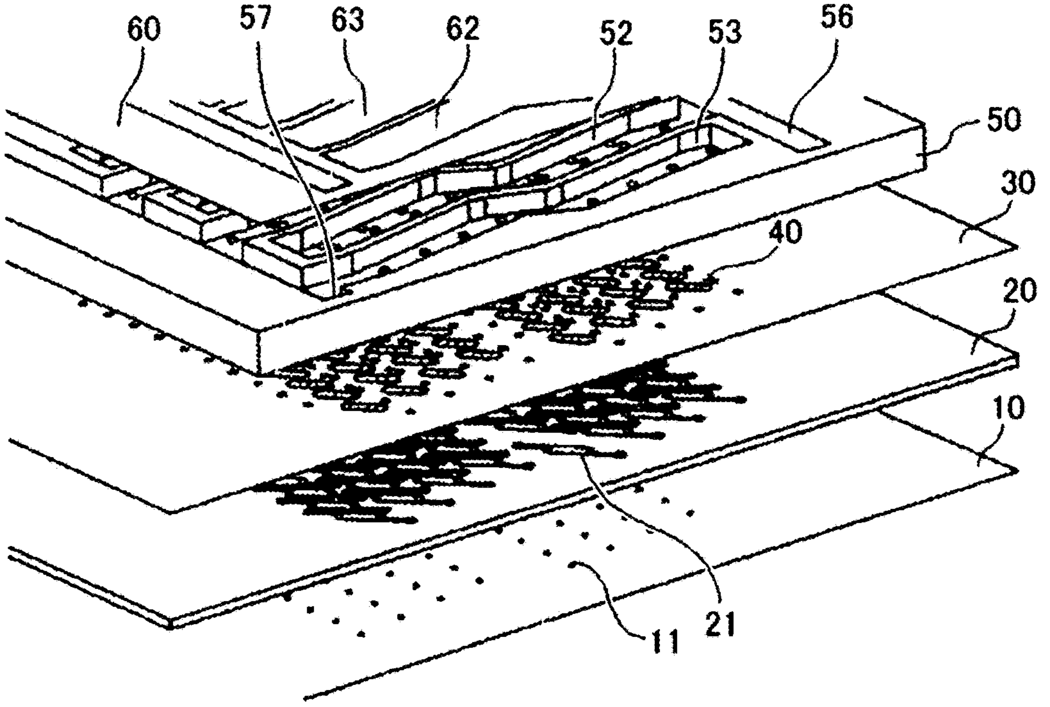
FIG. 4 is an exploded perspective explanatory view of the liquid discharge head, excluding a frame member.

FIG. 4 is an exploded perspective explanatory view of the liquid discharge head, excluding a frame member.

Figure 5:
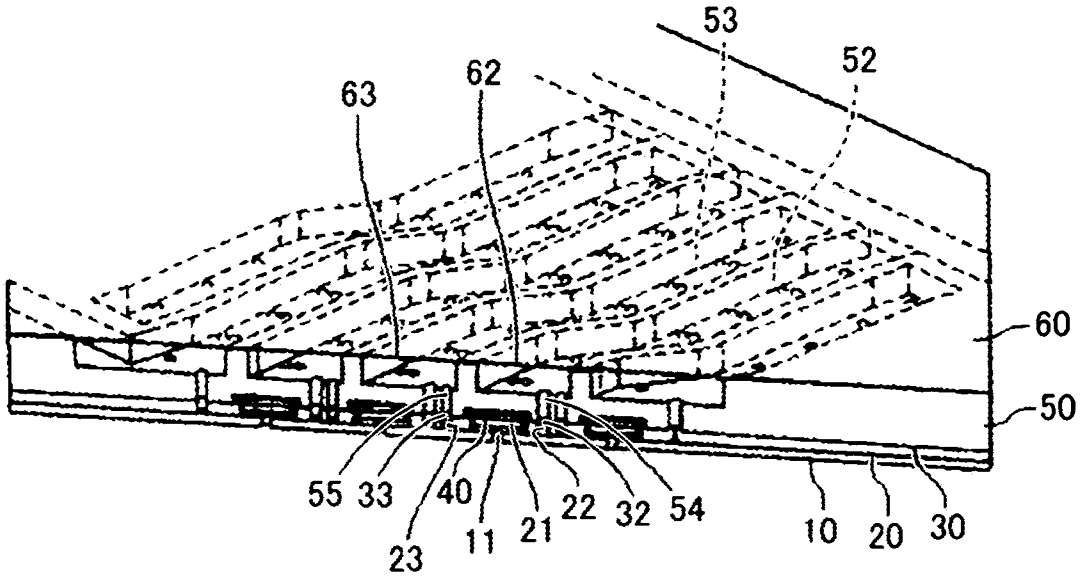
FIG. 5 is a cross-sectional perspective explanatory view of a channel portion of the liquid discharge head.

FIG. 5 is a cross-sectional perspective explanatory view of a channel portion of the liquid discharge head.

Figure 6:
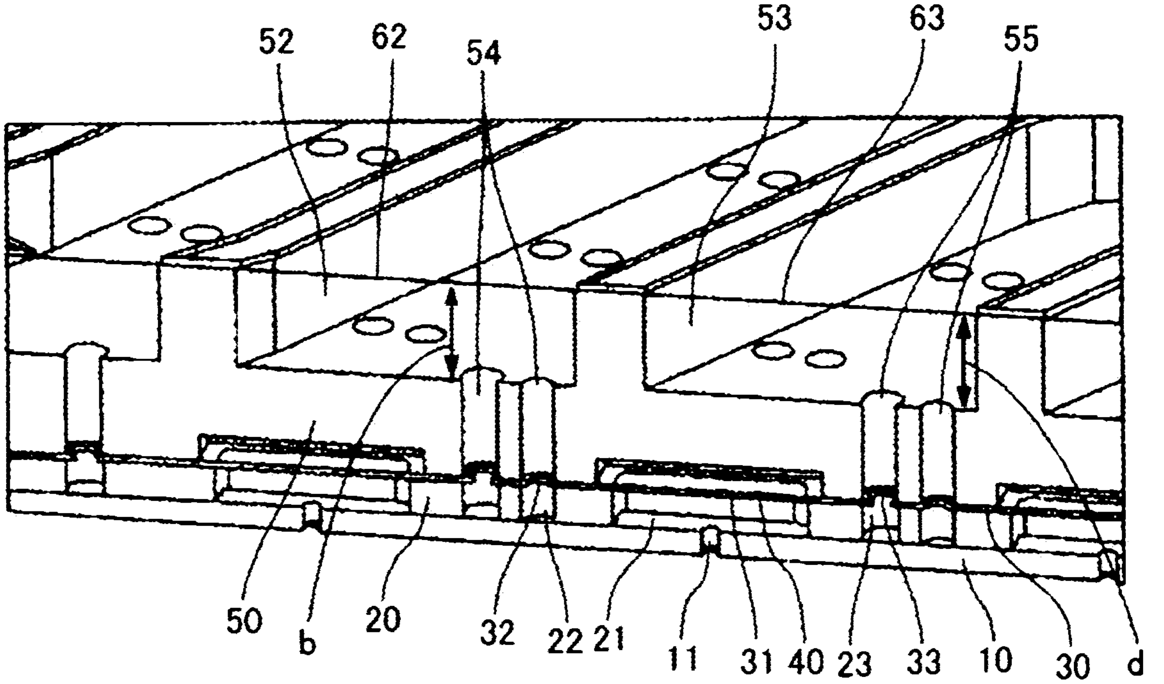
FIG. 6 is an enlarged cross-sectional perspective explanatory view of a channel portion of the liquid discharge head.

FIG. 6 is an enlarged cross-sectional perspective explanatory view of a channel portion of the liquid discharge head.

Figure 7:
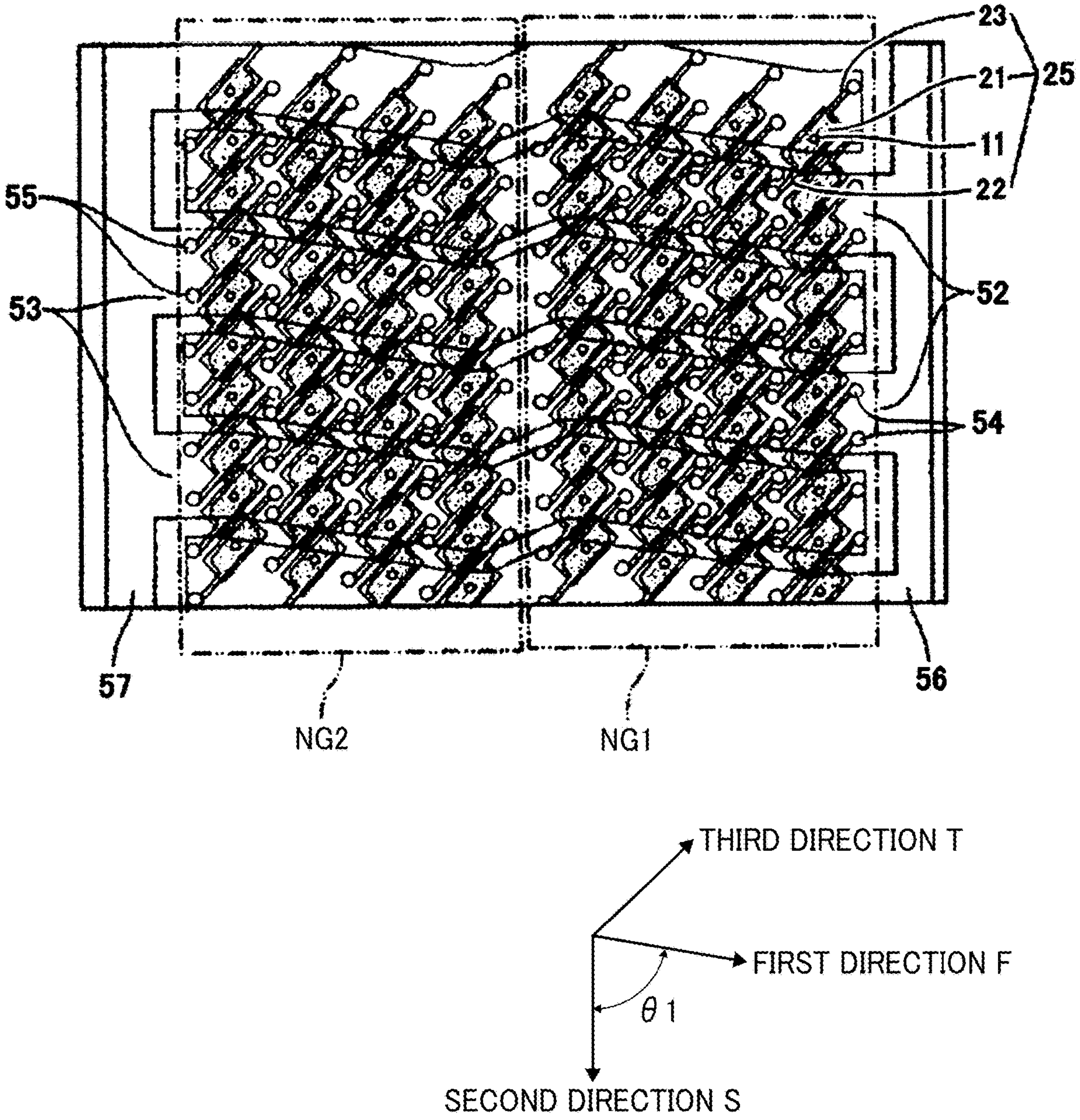
FIG. 7 is a plan explanatory view of a channel portion of the liquid discharge head.

FIG. 7 is a plan explanatory view of a channel portion of the liquid discharge head.

A liquid discharge head 1 according to the present embodiment includes a nozzle plate 10, a channel plate 20 that serves as an individual channel member, a diaphragm member 30, a common channel member 50, a damper member 60, a frame member 80, and a flexible wiring board 101 having a drive circuit 102 mounted thereon.

A nozzle substrate constituting the nozzle plate 10, a substrate constituting the channel plate 20 and the diaphragm member 30, a sub-frame substrate constituting the common channel member 50, and a damper substrate constituting the damper member 60 are all made of a single crystal Si wafer as a substrate material. A plurality of chips (liquid discharge heads) are simultaneously produced on a Si wafer by a microfabrication technique of MEMS or a semiconductor device, and the substrates after being formed into a chip are joined to form the liquid discharge head 1.

As illustrated in FIGS. 4 and 5, the nozzle plate 10 includes a plurality of nozzles 11 that discharges liquid (droplets). The plurality of nozzles 11 are two-dimensionally disposed in a matrix and disposed in three directions of a first direction F, a second direction S. and a third direction T as illustrated in FIG. 7.

As illustrated in FIGS. 5 and 6, the channel plate 20 includes a plurality of pressure chambers 21 (individual liquid chambers) respectively communicating with the plurality of nozzles 11, a plurality of individual supply channels 22 respectively communicating with the plurality of pressure chambers 21, and a plurality of individual collection channels 23 respectively communicating with the plurality of pressure chambers 21. As illustrated in FIG. 7, one of the pressure chambers 21, one of the individual supply channels 22 communicating with the pressure chamber 21, and one of the individual collection channels 23 communicating with the pressure chamber 21 are collectively referred to as an individual channel 25.

The diaphragm member 30 forms a diaphragm plate 31 that serves as a deformable wall surface of the pressure chamber 21, and a piezoelectric element 40 is integrally provided on the diaphragm plate 31. On the diaphragm member 30, a supply side opening 32 that communicates with the individual supply channel 22 and a collection side opening 33 that communicates with the individual collection channel 23 are formed. The piezoelectric element 40 is an electromechanical transducer element, and a pressure generating unit that deforms the diaphragm plate 31 to pressurize liquid in the pressure chamber 21.

Note that the channel plate 20 and the diaphragm member 30 are not limited to being separate members. For example, the channel plate 20 and the diaphragm member 30 can be integrally formed with the same member using a silicon on insulator (SOI) substrate. That is, an SOI substrate formed in order of a silicon oxide film, a silicon layer, and a silicon oxide film on a silicon substrate is used. The silicon substrate is used as the channel plate 20. The silicon oxide film, the silicon layer, and the silicon oxide film can form the diaphragm plate 31. In this configuration, the layer configuration of the silicon oxide film, the silicon layer, and the silicon oxide film in the SOI substrate serves as the diaphragm member 30. As described above, the diaphragm member 30 includes a member containing a film-formed material on the surface of the channel plate 20.

The common channel member 50 forms a plurality of common-supply branch channels 52 communicating with two or more of the individual supply channels 22 and a plurality of common-collection branch channels 53 communicating with two or more of the individual collection channels 23 alternately so as to be adjacent to each other in the second direction S of the nozzles 11. In the common channel member 50, a through hole that serves as a supply port 54 for communicating the supply side opening 32 of the individual supply channel 22 with the common-supply branch channel 52 and a through hole that serves as a collection port 55 for communicating the collection side opening 33 of the individual collection channel 23 with the common-collection branch channel 53 are formed.

The common channel member 50 forms one or more common-supply main channel 56 communicating with the plurality of common-supply branch channels 52 and one or more common-collection main channel 57 communicating with the plurality of common-collection branch channels 53.

The damper member 60 includes a supply side damper 62 facing (opposing) the supply port 54 of the common-supply branch channel 52 and a collection side damper 63 facing (opposing) the collection port 55 of the common-collection branch channel 53.

The common-supply branch channel 52 and the common-collection branch channel 53 are alternately arranged in the same common channel member 50 to form grooves, and the grooves are sealed with a damper plate 66 as a damper made of a thin plate. The supply side damper 62 is configured by the damper plate 66 corresponding to the common-supply branch channel 52, and the collection side damper 63 is configured by the damper plate 66 corresponding to the common-collection branch channel 53.

As the damper plate 66, a metal thin film or an inorganic thin film resistant to an organic solvent is preferably used, and the thickness thereof is preferably 10 [μm] or less. The damper plate 66 preferably has a laminated structure including a plurality of layers. Preferably, the damper plate 66 has a compliance of $7\times10^{-17}$ [m/N] or more, a Young's modulus of 3 [GPa] or more and 200 [GPa] or less, and a thickness of 2 [μm] or more and 10 [μm] or less in order to satisfy a function necessary as a damper.

The liquid discharge head 1 of the present embodiment includes the damper member 60 in order to suppress an influence (for example, crosstalk) of pressure fluctuation in the liquid channel (for example, the individual supply channel 22) generated at the time of liquid discharge from the nozzle 11 on liquid discharge from another nozzle 11. The damper member 60 appropriately exerts a damper function, which makes it possible to suppress the occurrence of crosstalk in which vibration (pressure fluctuation) at the time of liquid discharge propagates via liquid and affects liquid discharge from an adjacent nozzle, to stabilize liquid discharge accuracy from each nozzle 11.

Figure 8:
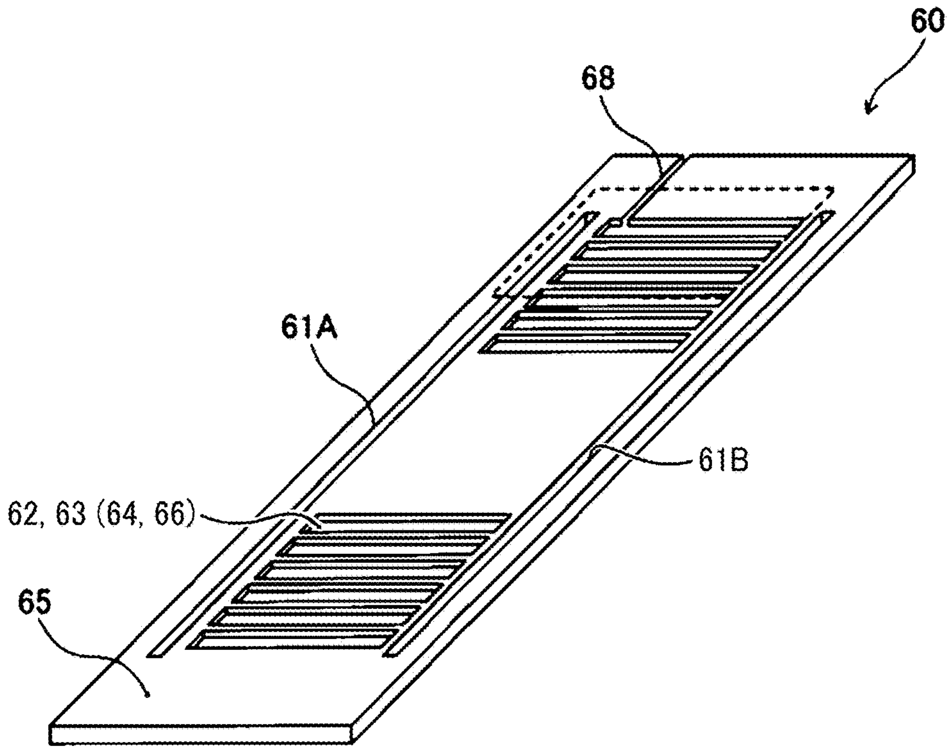
FIG. 8 is a perspective view illustrating a damper member according to the embodiment.

FIG. 8 is a perspective view illustrating the damper member 60 in the present embodiment.

As illustrated in FIG. 8, the damper member 60 mainly includes a damper frame substrate 65 as a damper holding substrate made of a rectangular plate-like member, and through holes 61A and 61B communicating with the common-supply main channel 56 and the common-collection main channel 57 of the common channel member 50 are formed along long sides of the damper frame substrate 65. The supply side damper 62 and the collection side damper 63 are formed in a region sandwiched between the through holes 61A and 61B of the damper frame substrate 65, thereby constituting the damper member 60.

Here, disadvantages in a conventional liquid discharge head will be described.

Figure 9:
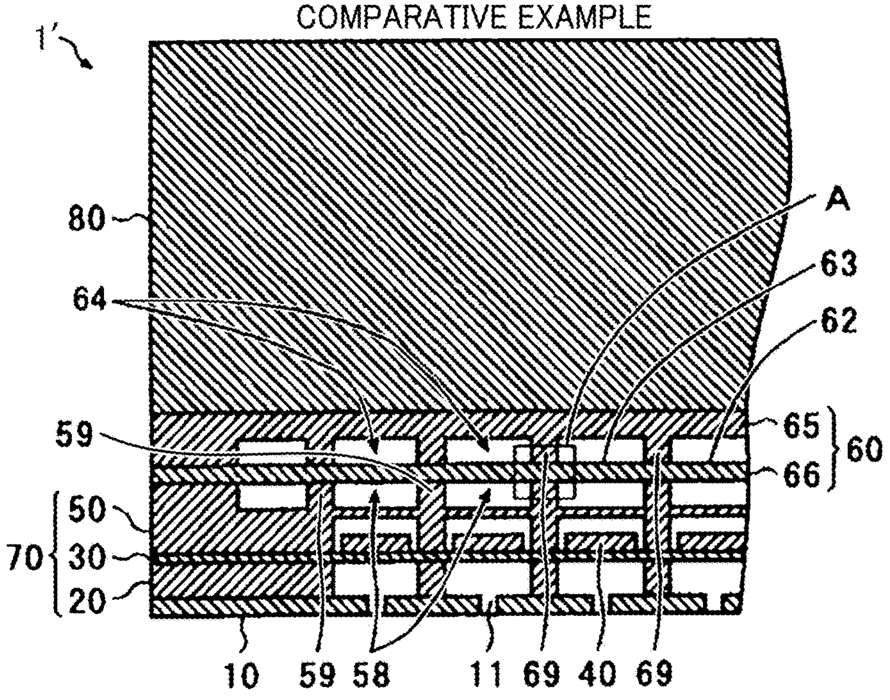
FIG. 9 is an explanatory view illustrating a laminated state of a nozzle plate, a channel plate, a diaphragm member, a common channel member, a damper member, and a frame member in a comparative example of a liquid discharge head.

FIG. 9 is an explanatory view illustrating a laminated state of a nozzle plate 10, a channel plate 20, a diaphragm member 30, a common channel member 50, a damper member 60, and a frame member 80 in a comparative liquid discharge head 1'.

In FIG. 9, the channel plate 20, the diaphragm member 30, and the common channel member 50 constitute a piezoelectric element holding substrate 70 as an actuator substrate. The general damper member 60 as illustrated in FIG. 9 is configured by overlapping a damper frame substrate 65 in which a gap 64 (displacement space) for enabling the displacement of a damper plate 66 is formed, with the damper plate 66, and joining the damper plate 66 and the damper frame substrate 65 with an adhesive. The gap 64 is partitioned and formed by a plurality of partition walls 69 formed in the damper frame substrate 65.

In FIG. 9, a plurality of gaps 58 for enabling the displacement (vibration) of the damper plate 66 are also formed in the common channel member 50. The gap 58 is partitioned and formed by a plurality of partition walls 59 formed in the common channel member 50. The gap 64 of the damper frame substrate 65 and the gap 58 of the common channel member 50 are disposed so as to face each other with the damper plate 66 interposed therebetween.

Figure 10:
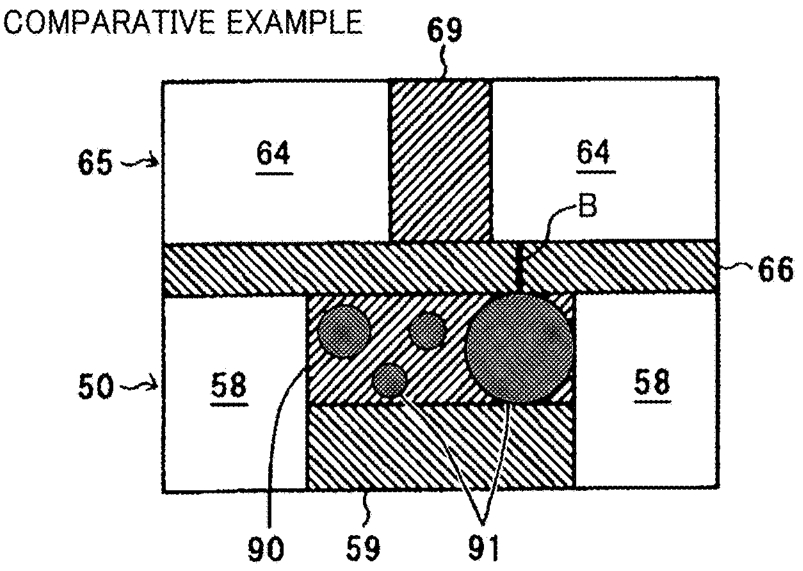
FIG. 10 is an enlarged view schematically illustrating the cross-sectional structure of a portion indicated by reference sign A in FIG. 9.

FIG. 10 is an enlarged view schematically illustrating the cross-sectional structure of a portion indicated by reference sign A in FIG. 9, that is, a joint portion of the partition wall 59 of the common channel member 50 constituting the piezoelectric element holding substrate 70, the damper plate 66, and the partition wall 69 of the damper frame substrate 65.

As illustrated in FIG. 10, a portion (bonding surface) of the partition wall 59 of the common channel member 50 (piezoelectric element holding substrate 70) that serves as a substrate to be jointed, and a facing region of the damper plate 66 facing the portion are bonded to each other with an adhesive 90. As the adhesive 90 used here, it is preferable to use an adhesive containing a filler 91 that serves as a bulking agent for the purpose of improving adhesiveness or improving bonding strength. The adhesive 90 used in the present embodiment contains a plurality of fillers 91 each having a spherical shape, and the maximum particle size thereof is 10 [μm].

As illustrated in FIG. 10, the diameter of the filler 91 is large, and w % ben the filler 91 is sandwiched between the partition wall 59 and the damper plate 66, there is a disadvantage that local stress acts on the damper plate 66 by the filler 91, a crack as indicated by reference sign B in FIG. 10 occurs, whereby the damper plate 66 is damaged. This disadvantage is not limited to the filler 91, and if a situation occurs, in which some foreign matter is sandwiched between the partition wall 59 and the damper plate 66 like the filler 91 when the foreign matter is mixed, the problem may similarly occur.

Figure 11A:
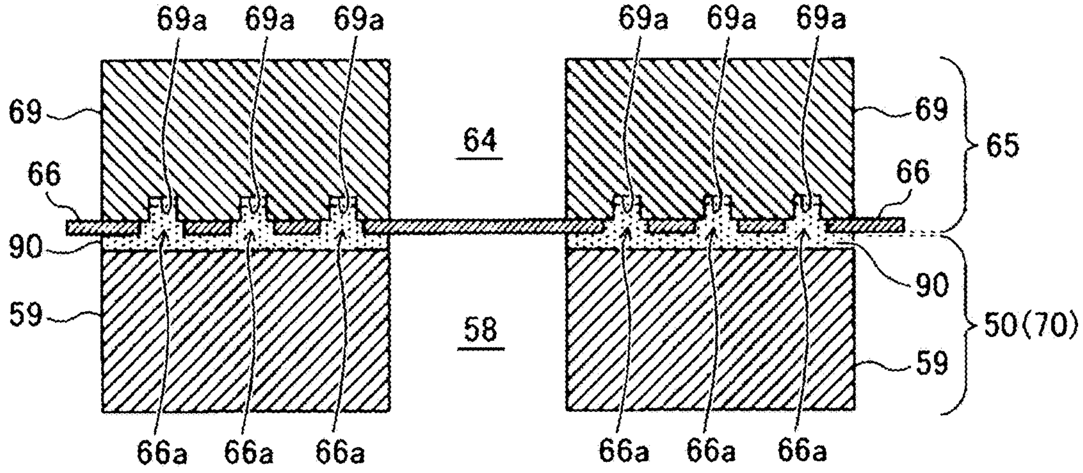
FIG. 11A is an explanatory view schematically illustrating the cross-sectional structure of a joint portion of a partition wall of a common channel member, a damper plate, and a partition wall of a damper frame substrate in the liquid discharge head according to the embodiment.

FIG. 11A is an explanatory view schematically illustrating the cross-sectional structure of a joint portion of the partition wall 59 of the common channel member 50, the damper plate 66, and the partition wall 69 of the damper frame substrate 65 in the liquid discharge head 1 according to the present embodiment.

Figure 11B:
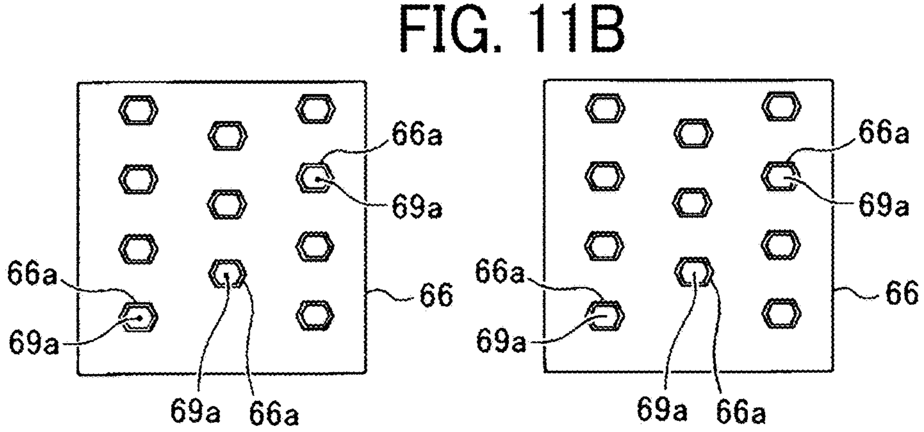
FIG. 11B is a schematic view of a damper member including the damper plate and the damper frame substrate in FIG. 11A as viewed from the side of the damper plate.

FIG. 11B is a schematic view of the damper member 60 including the damper plate 66 and the damper frame substrate 65 in FIG. 11A as viewed from the side of the damper plate 66.

As illustrated in FIG. 11A, in the liquid discharge head 1 according to the present embodiment, a through hole 66*a* is formed in the damper plate 66 in the joint portion of the damper plate 66 and the common channel member 50 (piezoelectric element holding substrate 70). As a result, even when the filler 91 and the foreign matter which may be sandwiched between the damper plate 66 and the common channel member 50 in the comparative liquid discharge head 1' are interposed, at least a part of the filler 91 and the foreign matter can enter the through hole 66*a* in the liquid discharge head 1 of the present embodiment, to be prevented from being sandwiched therebetween. Therefore, according to the present embodiment, it is possible to reduce the probability that the filler 91 and the foreign matter are sandwiched between the damper plate 66 and the common channel member 50, whereby damage to the damper plate 66 can be suppressed.

By providing such a through hole 66*a* in the damper plate 66, the bonding area between the damper plate 66 and the adhesive 90 can be increased. As a result, it is also possible to increase the bonding strength between the damper member 60 including the damper plate 66 and the common channel member 50 (piezoelectric element holding substrate 70) that serves as a substrate to be bonded which is bonded to the damper member 60 with the adhesive 90.

In the present embodiment, the example in which the through hole 66*a* is provided in the damper plate 66 has been described, but a recess may be formed instead of the through hole 66*a* in the facing region of the damper plate 66 facing the common channel member 50 in the joint portion. Even with this configuration, at least apart of the filler 91 and the foreign matter enters the recess, so that the probability that the filler 91 and the foreign matter are sandwiched between the damper plate 66 and the common channel member 50 can be reduced, whereby damage to the damper plate 66 can be suppressed. Also in the case of providing the recess, similarly to the case of providing the through hole 66*a*, the bonding area between the damper plate 66 and the adhesive 90 can be increased, whereby the bonding strength between the damper member 60 including the damper plate 66 and the common channel member 50 (piezoelectric element holding substrate 70) bonded to the damper member 60 with the adhesive 90 can be increased.

In the present embodiment, as illustrated in FIG. 11A, a recessed portion 69*a* is formed in the partition wall 69 of the damper frame substrate 65 that serves as the other substrate so as to face the through hole 66*a* formed in the damper plate 66. That is, in the present embodiment, in the damper frame substrate 65 that serves as the other substrate positioned on the opposite side to the common channel member 50 (the piezoelectric element holding substrate 70) that serves as a substrate to be bonded which is bonded to the damper plate 66 with the adhesive 90, the recessed portion 69*a* is formed in the facing region facing the through hole 66*a* of the damper plate 66. According to this, the adhesive 90 can also enter the recessed portion 69*a* of the damper frame substrate 65 through the through hole 66*a* of the damper plate 66. Therefore, the bonding area between the damper member 60 including the damper frame substrate 65 and the adhesive 90 is increased, and the bonding strength between the damper member 60 and the common channel member 50 (piezoelectric element holding substrate 70) can be further enhanced.

In particular, in the present embodiment, as illustrated in FIGS. 11A and 11B, the opening area of the through hole 66*a* of the damper plate 66 is formed to be larger than the opening area of the recessed portion 69*a* of the damper frame substrate 65. Therefore, a step is generated between the through hole 66*a* and the recessed portion 69*a*, and the bonding area is further increased, whereby higher bonding strength can be realized.

Figure 12A:
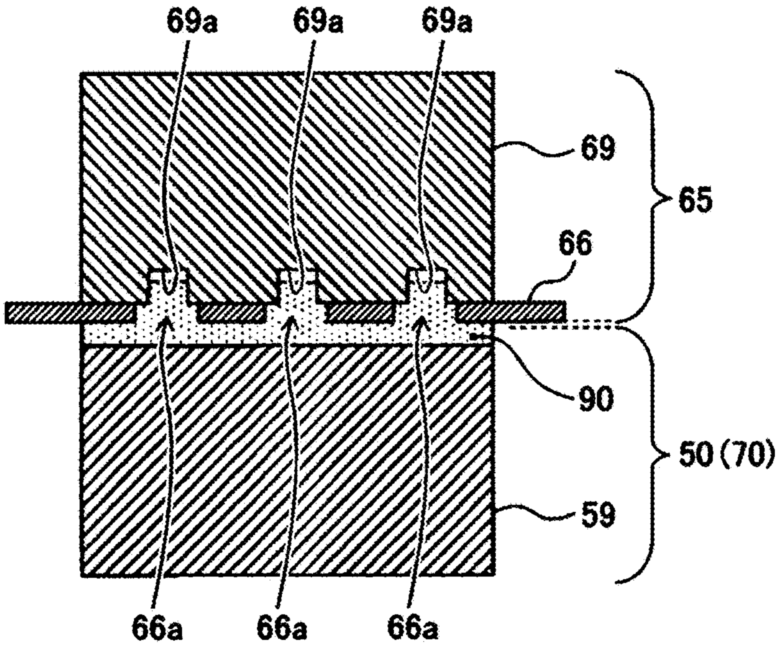
FIG. 12A is an explanatory view schematically illustrating the cross-sectional structure of a joint portion of a partition wall of a common channel member, a damper plate, and a partition wall of a damper frame substrate in a liquid discharge head as an example in which a through hole having a linear shape is formed in the damper plate.
Figure 12B:
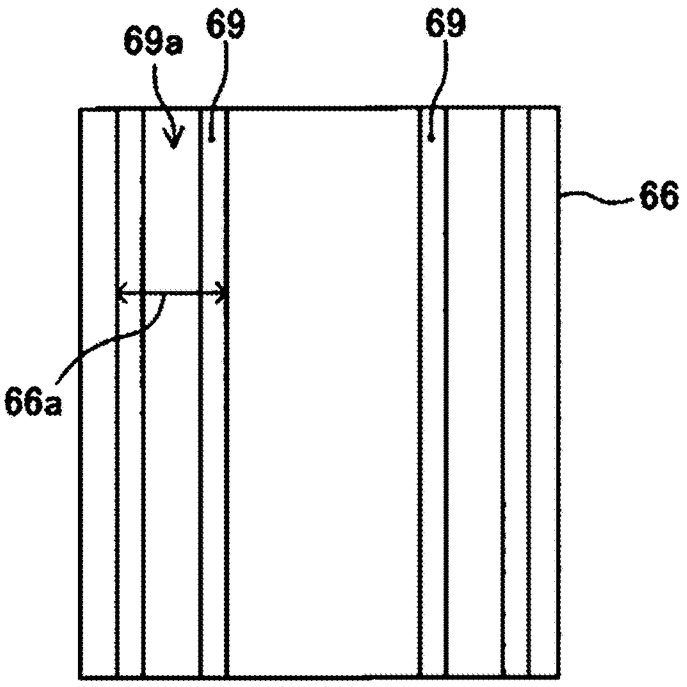
FIG. 12B is a schematic view of a damper member including the damper plate and the damper frame substrate in FIG. 12A as viewed from the side of the damper plate.

The opening shape of the through hole 66*a* in the present embodiment is a hexagonal shape as illustrated in FIG. 11B, but is not limited thereto, and may be a polygonal shape other than a hexagonal shape such as a triangular shape, a quadrangular shape, a pentagonal shape, or a heptagonal shape, or may be a circular shape, an elliptical shape, or the like. As illustrated in FIGS. 12A and 12B, the opening shape of the through hole 66*a* may be a linear shape along the substrate surface (the plane of paper of FIG. 12B) of the damper frame substrate 65.

In the present embodiment, as illustrated in FIG. 11B, the plurality of through holes 66*a* formed to be separated from each other are disposed to be dispersed in a two-dimensional direction, but the present embodiment is not limited thereto, and at least some of the plurality of through holes 66*a* may be connected to each other.

Figure 13:
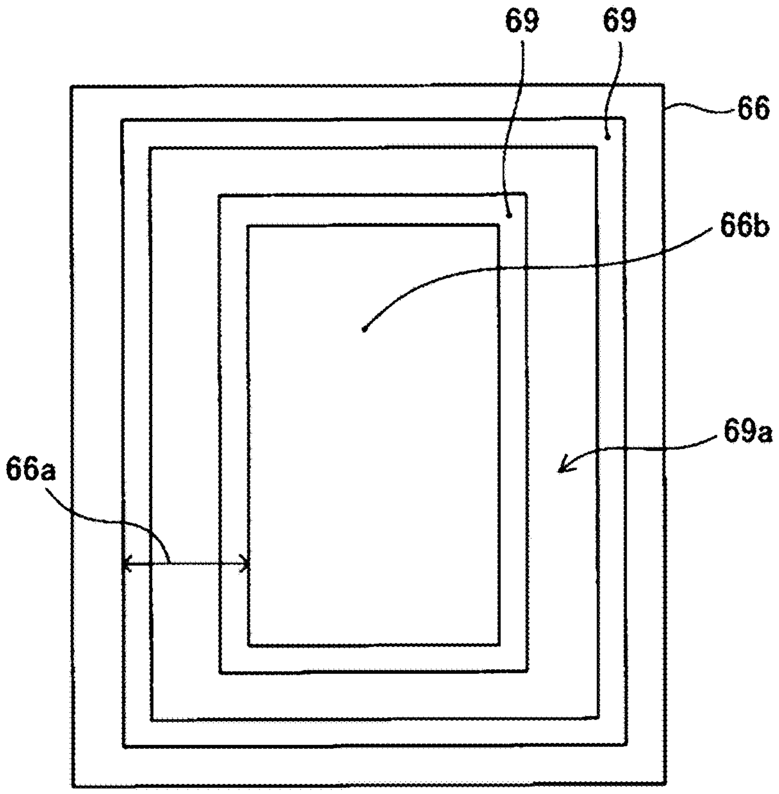
FIG. 13 is a schematic view of a damper member including a damper plate and a damper frame substrate as viewed from the side of the damper plate in a liquid discharge head as an example in which a through hole of the damper plate is formed so as to surround an island portion.

In the present embodiment, as illustrated in FIG. 13, the through hole 66*a* of the damper plate 66 may be formed so as to surround an island portion 66*b* (damper portion) in which the through hole 66*a* is not formed in the facing region facing the portion (bonding surface) of the partition wall 59 of the common channel member 50 (piezoelectric element holding substrate 70). According to this, it is possible to obtain an effect that the excess of the adhesive 90 for bonding the island portion 66*b* of the damper plate 66 is taken into the through hole 66*a* and the excess of the adhesive 90 hardly protrudes from the partition wall 59.

Figure 14:
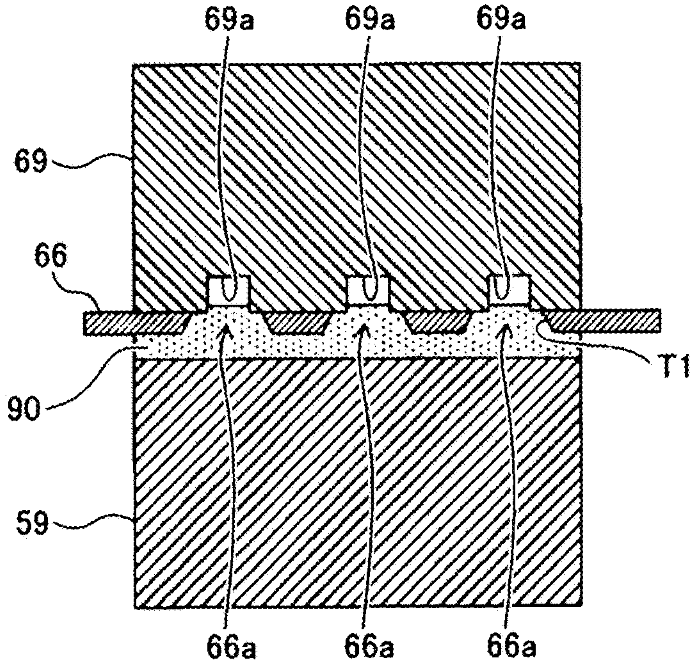
FIG. 14 is an explanatory view schematically illustrating the cross-sectional structure of a joint portion of a partition wall of a common channel member, a damper plate, and a partition wall of a damper frame substrate in a liquid discharge head as an example in which a through hole of the damper plate has a tapered shape tapered in a depth direction.
Figure 15:
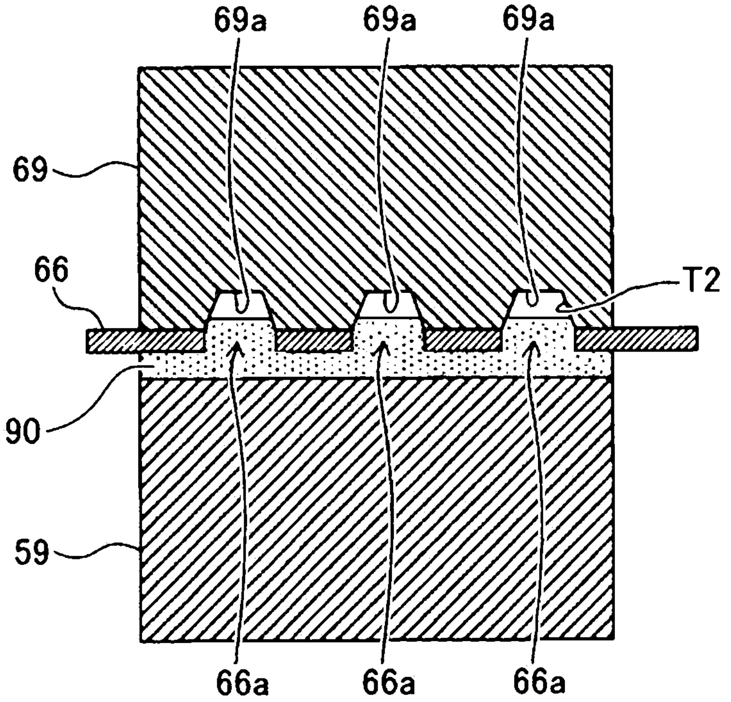
FIG. 15 is an explanatory view schematically illustrating the cross-sectional structure of a joint portion of a partition wall of a common channel member, a damper plate, and a partition wall of a damper frame substrate in a liquid discharge head as an example in which a recessed portion of the damper frame substrate has a tapered shape tapered in a depth direction.

In the present embodiment, the through hole 66*a* of the damper plate 66 may have a tapered shape tapered in a depth direction as indicated by reference numeral T1 in FIG. 14. In this case, the filler 91 and the foreign matter easily enter a further inner or deeper portion of the through hole 66*a*, which makes it possible to further reduce the risk of damage to the damper plate 66. Similarly, the recessed portion 69*a* of the partition wall 69 of the damper frame substrate 65 may also have a tapered shape tapered in the depth direction as indicated by reference numeral T2 in FIG. 15. Also in this case, the filler 91 and the foreign matter easily enter a further inner or deeper portion of the recessed portion 69*a*, which makes it possible to further reduce the risk of damage to the damper plate 66.

Figure 16:
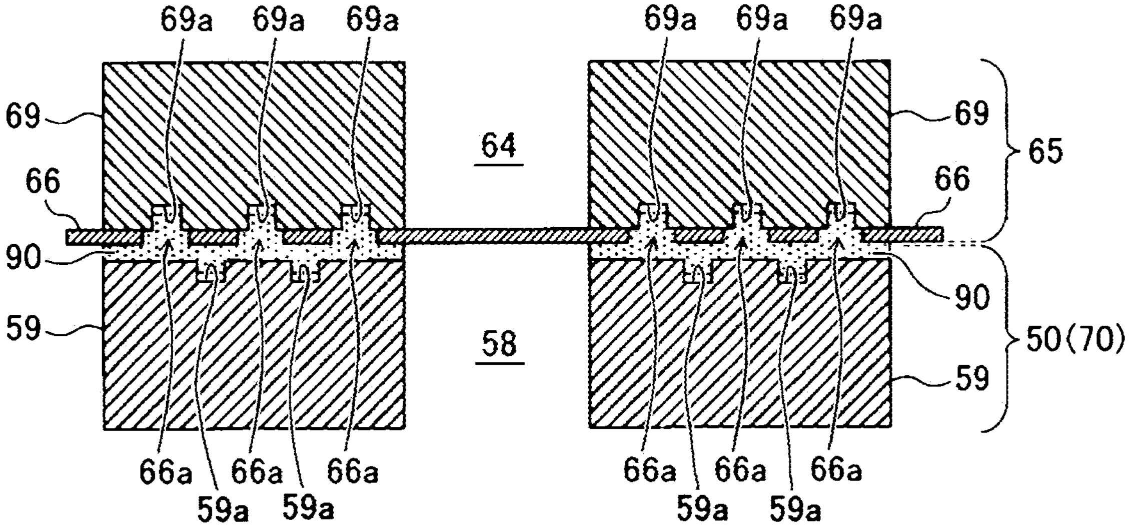
FIG. 16 is an explanatory view schematically illustrating the cross-sectional structure of a joint portion of a partition wall of a common channel member, a damper plate, and a partition wall of a damper frame substrate in a modification.

[Modification] Next, in the liquid discharge head 1 according to the above-described embodiment, a modification of the joint portion of the partition wall 59 of the common channel member 50, the damper plate 66, and the partition wall 69 of the damper frame substrate 65 will be described. FIG. 16 is an explanatory view schematically illustrating the cross-sectional structure of a joint portion of the partition wall 59 of the common channel member 50, the damper plate 66, and the partition wall 69 of the damper frame substrate 65 in the present modification.

FIG. 16 is an explanatory view schematically illustrating the cross-sectional structure of a joint portion of the partition wall 59 of the common channel member 50, the damper plate 66, and the partition wall 69 of the damper frame substrate 65 in the present modification.

In the present modification, as illustrated in FIG. 16, a recessed portion 59*a* is formed in a portion of the partition wall 59 of the common channel member 50 (piezoelectric element holding substrate 70) that serves as a substrate to be bonded in the liquid discharge head 1 of the above-described embodiment. Specifically, the recessed portion 59*a* is formed so as to face a portion of the damper plate 66 where a through hole 66*a* is not formed in the portion of the partition wall 59 of the common channel member 50 in the present modification. Thus, the recessed portion 59*a* is formed in a non-facing region not facing the joint portion of the damper plate 66.

As a result, even when a filler 91 and a foreign matter which may be sandwiched between the damper plate 66 and the common channel member 50 in the comparative liquid discharge head 1' are interposed, at least a part of the filler 91 and the foreign matter can enter not only the through hole 66*a* of the damper plate 66 but also the recessed portion 59*a* of the common channel member 50 in the liquid discharge head 1 of the present modification. Therefore, according to the present modification, the probability that the filler 91 and the foreign matter are sandwiched between the damper plate 66 and the common channel member 50 can be reduced, whereby damage to the damper plate 66 can be suppressed.

By providing such a recessed portion 59*a* in the common channel member 50, the bonding area between the common channel member 50 and the adhesive 90 can be increased. As a result, the bonding strength between the damper member 60 and the common channel member 50 (piezoelectric element holding substrate 70) can be further enhanced.

In the present modification, the recessed portion 59*a* of the common channel member 50 may be formed so as to extend to a region facing the through hole 66*a* of the damper plate 66. In this case, a portion where the distance between the common channel member 50 and the damper plate 66 is the shortest can be reduced, and the probability that the filler 91 and the foreign matter are sandwiched between the damper plate 66 and the common channel member 50 can be further reduced. Therefore, damage to the damper plate 66 can be further suppressed.

Although the present modification is the example in which the through hole 66a is formed in the damper plate 66 similarly to the above-described embodiment, the effect obtained by providing the recessed portion 59a in the common channel member 50 can be similarly obtained even when the through hole 66a is not formed in the damper plate 66.

Figure 17:
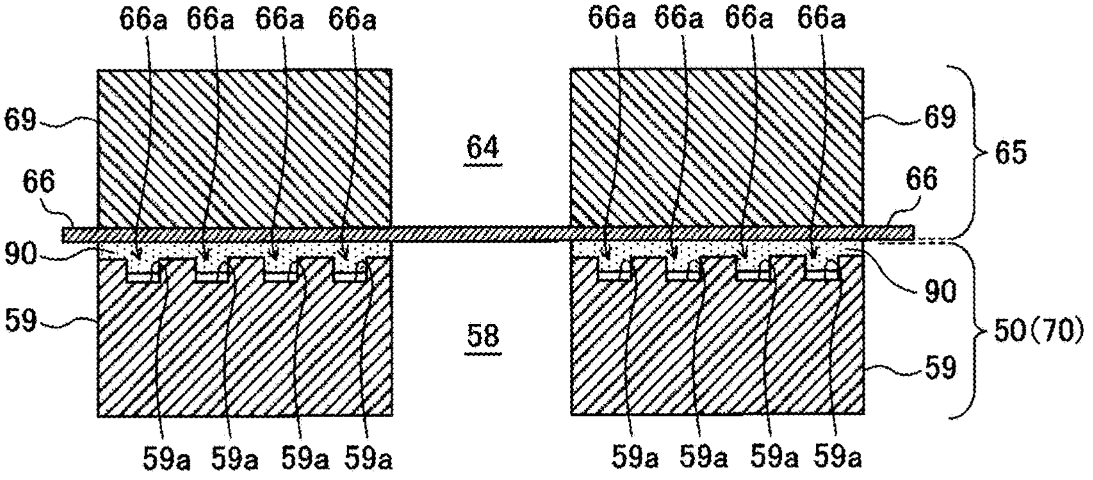
FIG. 17 is an explanatory view schematically illustrating the cross-sectional structure of a joint portion as an example in which a through hole is not formed in a damper plate in a modification.

For example, as illustrated in FIG. 17, in the common channel member 50 (piezoelectric element holding substrate 70), the recessed portion 59a may be formed in a facing region facing the bonding surface of the damper plate 66 in which the through hole 66a is not formed. Even with this configuration, when the filler 91 and the foreign matter which may be sandwiched between the damper plate 66 and the common channel member 50 in the comparative liquid discharge head 1' are interposed, at least a part of the filler 91 and the foreign matter can enter the recessed portion 59a of the common channel member 50 to be prevented from being sandwiched therebetween. Therefore, also in the example of FIG. 17, the probability that the filler 91 and the foreign matter are sandwiched between the damper plate 66 and the common channel member 50 can be reduced, whereby damage to the damper plate 66 can be suppressed. The bonding area can be increased by providing the recessed portion 59a in the common channel member 50, whereby the bonding strength between the damper member 60 and the common channel member 50 (piezoelectric element holding substrate 70) can also be enhanced.

In particular, in the example of FIG. 17, the through hole 66a is not formed in the damper plate 66, which has an advantage that the rigidity of the damper plate 66 is not reduced and the rigidity of the damper plate 66 is easily secured. In the example of FIG. 17, the recessed portion 69a is not also formed in the damper frame substrate 65, which has an advantage that the rigidity of the damper frame substrate 65 is not reduced and the rigidity of the damper frame substrate 65 is also easily secured.

Next, a liquid discharge device including each of the above-described liquid discharge heads 1 will be described.

Figure 18:
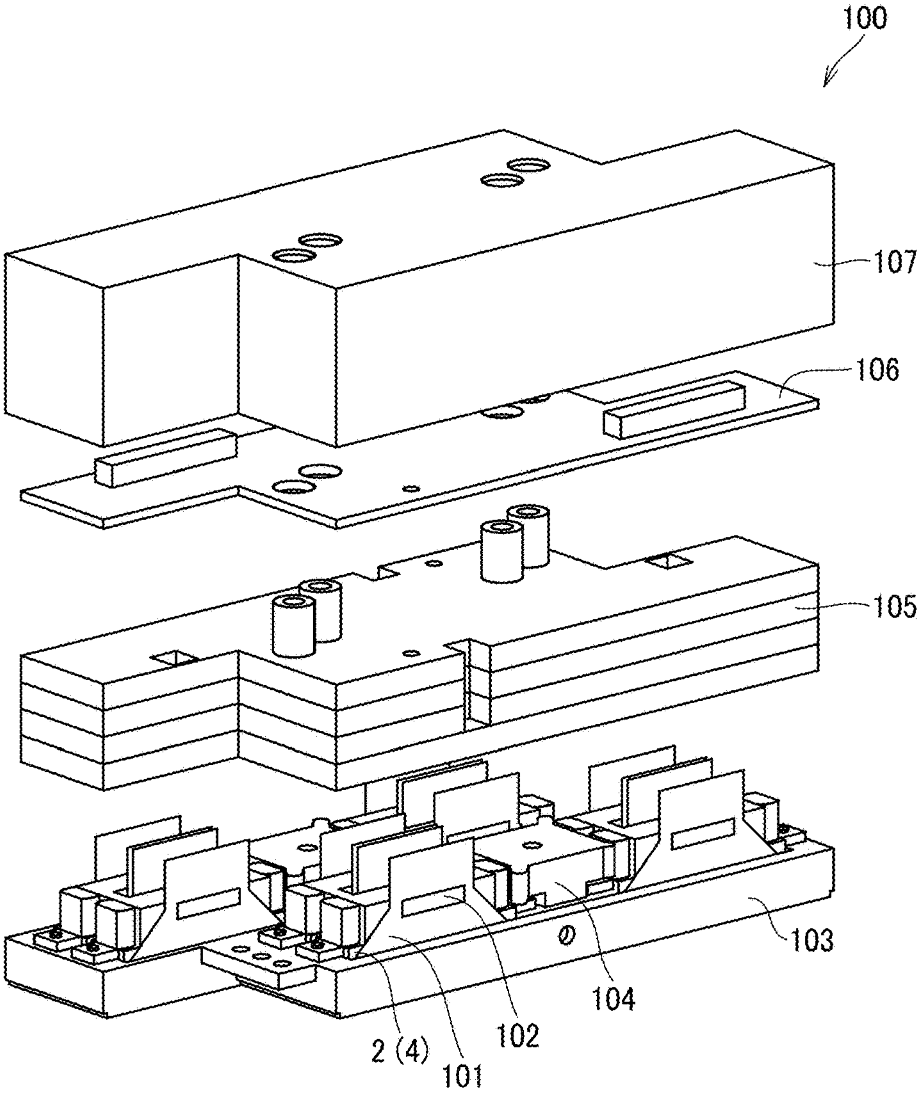
FIG. 18 is an exploded perspective explanatory view of a head module according to an embodiment.
Figure 19:
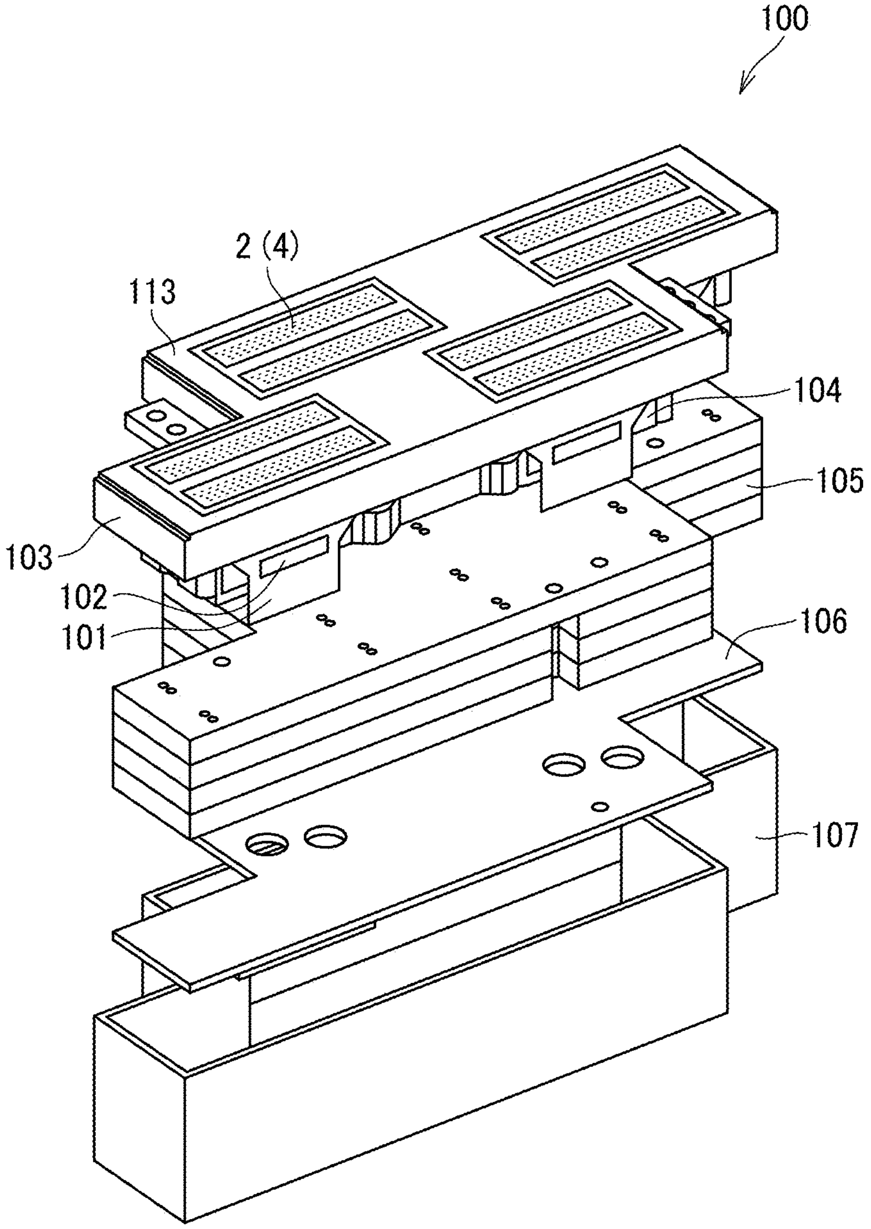
FIG. 19 is an exploded perspective explanatory view of the head module of the embodiment as viewed from the side of the nozzle surface.

As illustrated in FIGS. 18 and 19, a liquid discharge device 100 includes a plurality of liquid discharge heads 1, a base member 103 that holds the plurality of liquid discharge heads 1, and a cover member 113 that serves as a nozzle cover of the liquid discharge heads 1. The liquid discharge device 100 further includes a heat dissipation member 104, a manifold 105 forming a channel to supply liquid to the plurality of liquid discharge heads 1, a printed circuit board (PCB) 106 connected to a flexible wiring board 101, and a module case 107.

Next, a liquid discharge apparatus including each of the liquid discharge heads 1 described above will be described.

Figure 20:
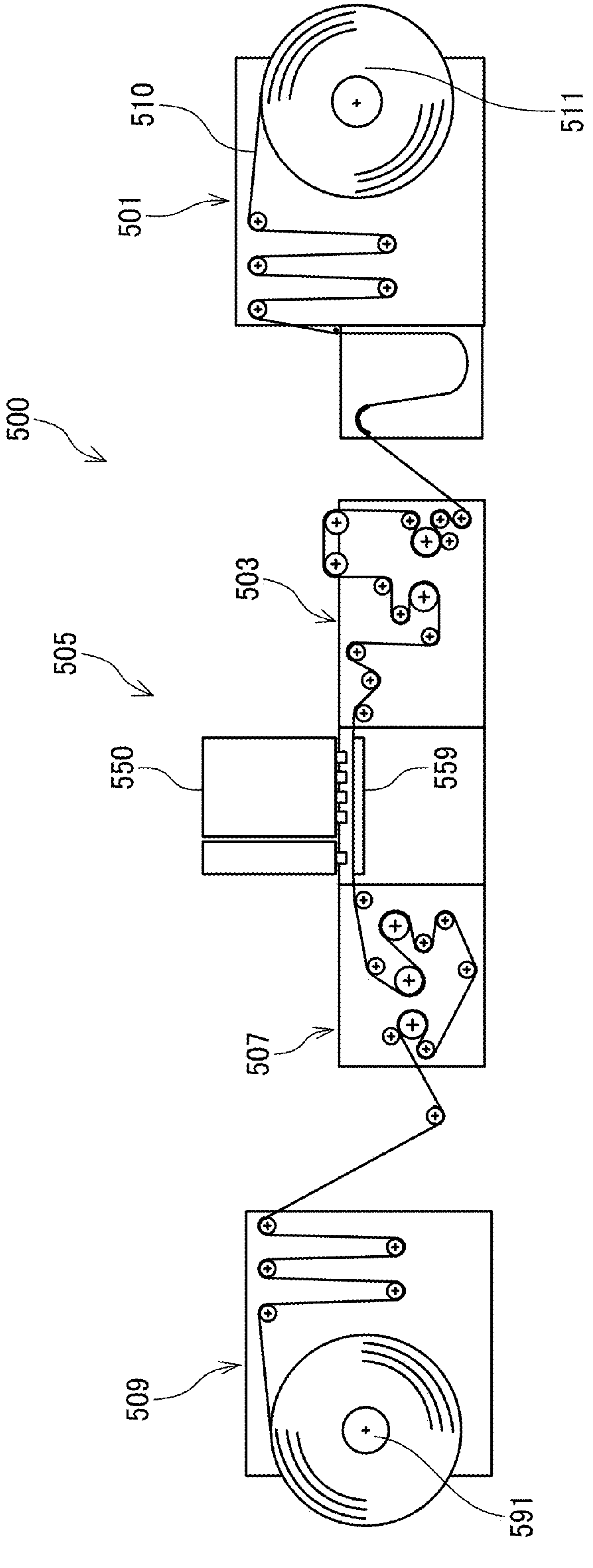
FIG. 20 is a schematic explanatory view of a printer according to an embodiment.
Figure 21:
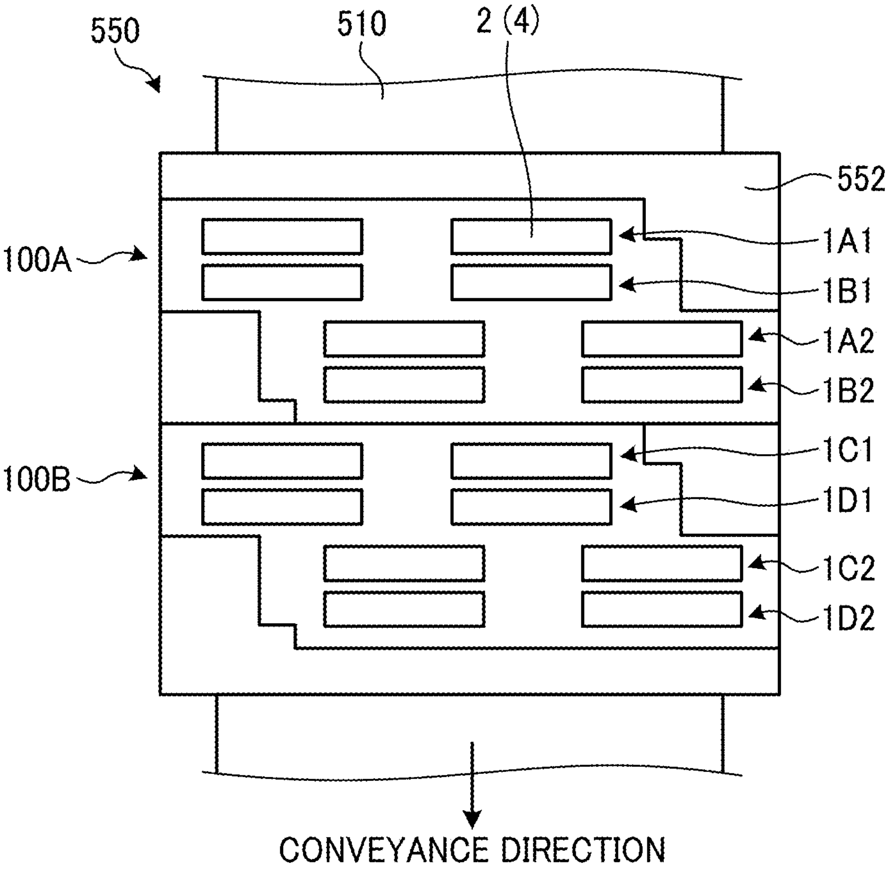
FIG. 21 is a plan explanatory view of an example of a head unit of the printer.

As illustrated in FIGS. 20 and 21, a printer 500 that serves as the liquid discharge apparatus includes a feeding unit 501 that feeds a continuous body 510 serving as a recording medium, and a guide conveying unit 503 that guides and conveys the continuous body 510 fed by the feeding unit 501 toward a printing unit 505. The printer 500 includes a printing unit 505 that performs a printing operation of discharging liquid onto the continuous body 510 to form an image, a drying unit 507 that dries the continuous body 510 to which the liquid adheres, an ejecting unit 509 that ejects the continuous body 510, and the like.

The continuous body 510 is sent out from a winding roller 511 of the feeding unit 501, guided and conveyed by rollers of the feeding unit 501, the guide conveying unit 503, the drying unit 507, and the ejecting unit 509, and wound around a take-up roller 591 of the ejecting unit 509. The continuous body 510 is conveyed on a conveyance guide member 559 in the printing unit 505 so as to face a head unit 550 that serves as a liquid discharge device, and an image is printed by liquid discharged from the head unit 550.

The printer 500 includes liquid discharge devices 100A and 100B described above in the head unit 550, and each of the liquid discharge devices 100A and 100B is provided on a common base member 552.

When the arrangement direction of the liquid discharge heads 1 in a direction orthogonal to the conveyance direction of the continuous body is a head arrangement direction, in each of the liquid discharge devices 100A and 100B, liquid of the same color is discharged by a set of head rows 1A1 and 1A2 of the liquid discharge device 100A. Similarly, liquid of a desired color is discharged by a set of head rows 1B1 and 1B2 of the liquid discharge device 100A, a set of head rows 1C1 and 1C2 of the liquid discharge device 100B, and a set of head rows 1D1 and 1D2 of the liquid discharge device 100B.

Figure 22:
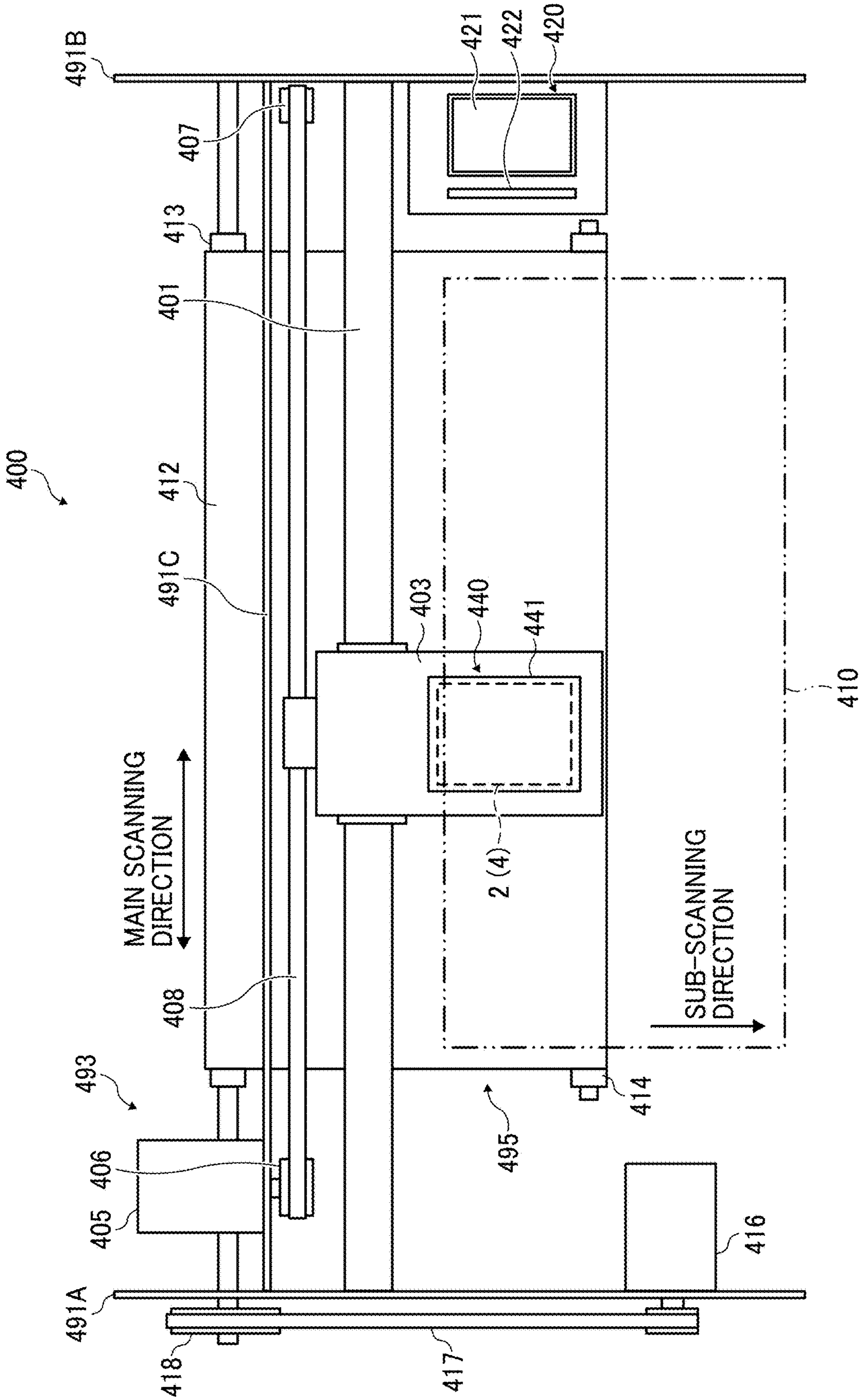
FIG. 22 is a plan explanatory view of a main part of an example of the printer.
Figure 23:
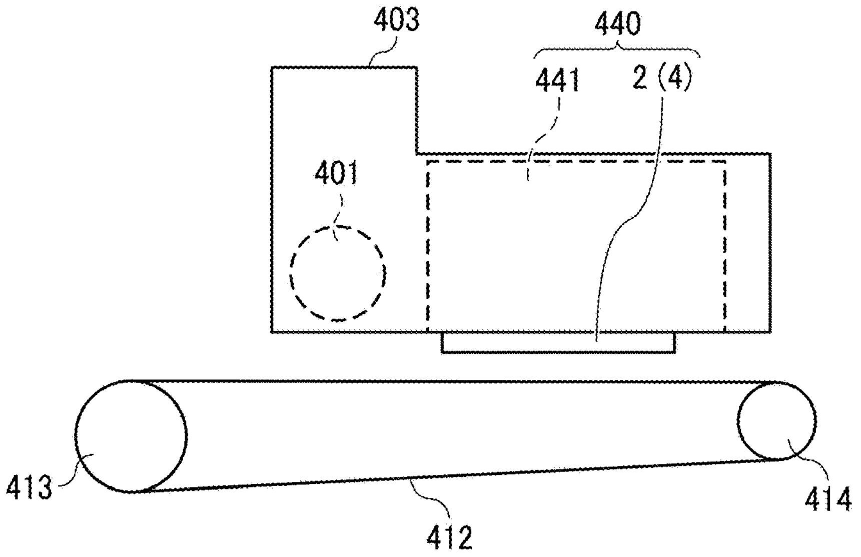
FIG. 23 is a side explanatory view of a main part of an example of the printer.

Next, another example of the printer that serves as the liquid discharge apparatus will be described with reference to FIGS. 22 and 23.

A printer 400 as the liquid discharge apparatus is a serial type printer, and a carriage 403 reciprocates in a main scanning direction by a main scanning moving mechanism 493. The main scanning moving mechanism 493 includes a guide member 401, a main scanning motor 405, a timing belt 408, and the like. The guide member 401 is stretched between the left side plate 491A and the right side plates 491B to movably hold the carriage 403. The carriage 403 is reciprocated in the main scanning direction by transmission of the driving force of the main scanning motor 405 via the timing belt 408 stretched between a driving pulley 406 and a driven pulley 407.

A liquid discharge device 440 integrally including a liquid discharge head 1 and a head tank 441 is mounted on the carriage 403. Here, the liquid discharge head 1 discharges liquid of each of colors of, for example, yellow (Y), cyan (C), magenta (M), and black (K). The liquid discharge head 1 is mounted in a state where nozzle rows including a plurality of nozzles are arranged in a sub-scanning direction orthogonal to the main scanning direction with a liquid discharge direction downward. The liquid discharge head 1 is connected to a liquid circulation device, and liquid of a desired color is circulated and supplied to the liquid discharge head 1.

The printer 400 includes a conveyance mechanism 495 that conveys a paper sheet 410 that serves as a recording medium. The conveyance mechanism 495 includes a conveyance belt 412 that serves as a conveying means, and a sub-scanning motor 416 that drives the conveyance belt 412. The conveyance belt 412 that serves as an endless belt is stretched between a conveyance roller 413 and a tension roller 414, and attracts and conveys the paper sheet 410 at a position facing the liquid discharge head 1. Attraction is performed by electrostatic attraction, air suction, or the like. The conveyance belt 412 is circularly moved in the sub-scanning direction by transmitting the driving force of the sub-scanning motor 416 via a timing belt 417 and a timing pulley 418.

On one side of the carriage 403 in the main scanning direction, a maintenance recovery mechanism 420 that maintains and recovers the liquid discharge head 1 is disposed on a side of the conveyance belt 412. The maintenance recovery mechanism 420 includes, for example, a cap member 421 that caps the nozzle surface of the liquid discharge head 1 and a wiper member 422 that wipes the nozzle surface. The main scanning moving mechanism 493, the maintenance recovery mechanism 420, and the conveyance mechanism 495 are attached to a housing including the left side plate 491A, the right side plate 491B, and a back plate 491C.

In the printer 400 having the above-described configuration, the paper sheet 410 is attracted by the conveyance belt 412, and the paper sheet 410 is conveyed in the sub-scanning direction by the circular movement of the conveyance belt 412. The liquid discharge head 1 is driven in response to an image signal while the carriage 403 is moved in the main scanning direction, to discharge liquid onto the paper sheet 410 stopped, thus forming an image on the paper sheet 410.

Figure 24:
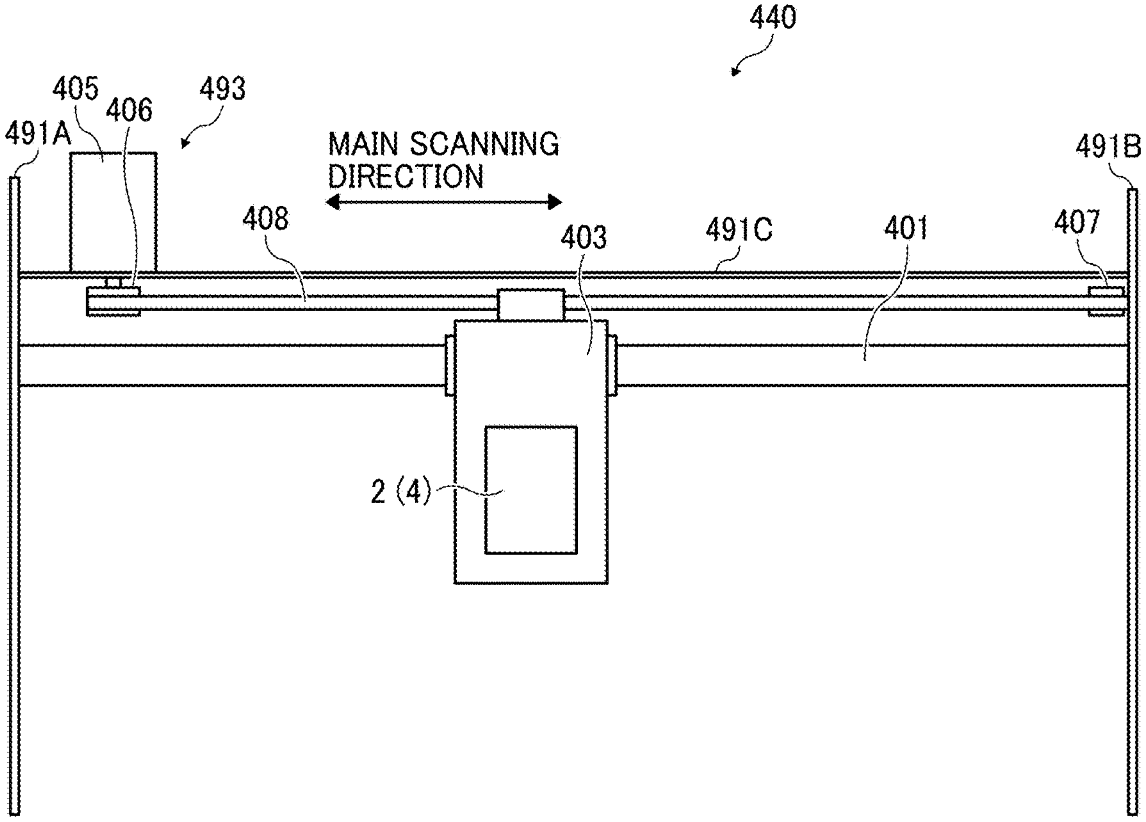
FIG. 24 is a plan explanatory view of a main part of an example of a liquid discharge device.

Next, the above-described liquid discharge device 440 will be described with reference to FIG. 24.

The liquid discharge device 440 includes a housing portion including the left side plate 491A, the right side plate 491B, and the back plate 491C, the main scanning moving mechanism 493, the carriage 403, the liquid discharge head 1, and the like among the members constituting the printer 400 that serves as the liquid discharge apparatus.

It is also possible to configure a liquid discharge device in which the maintenance recovery mechanism 420 described above is further attached to, for example, the right side plate 491B of the liquid discharge device 440.

Next, another example of the liquid discharge device will be described with reference to FIG. 25.

Figure 25:
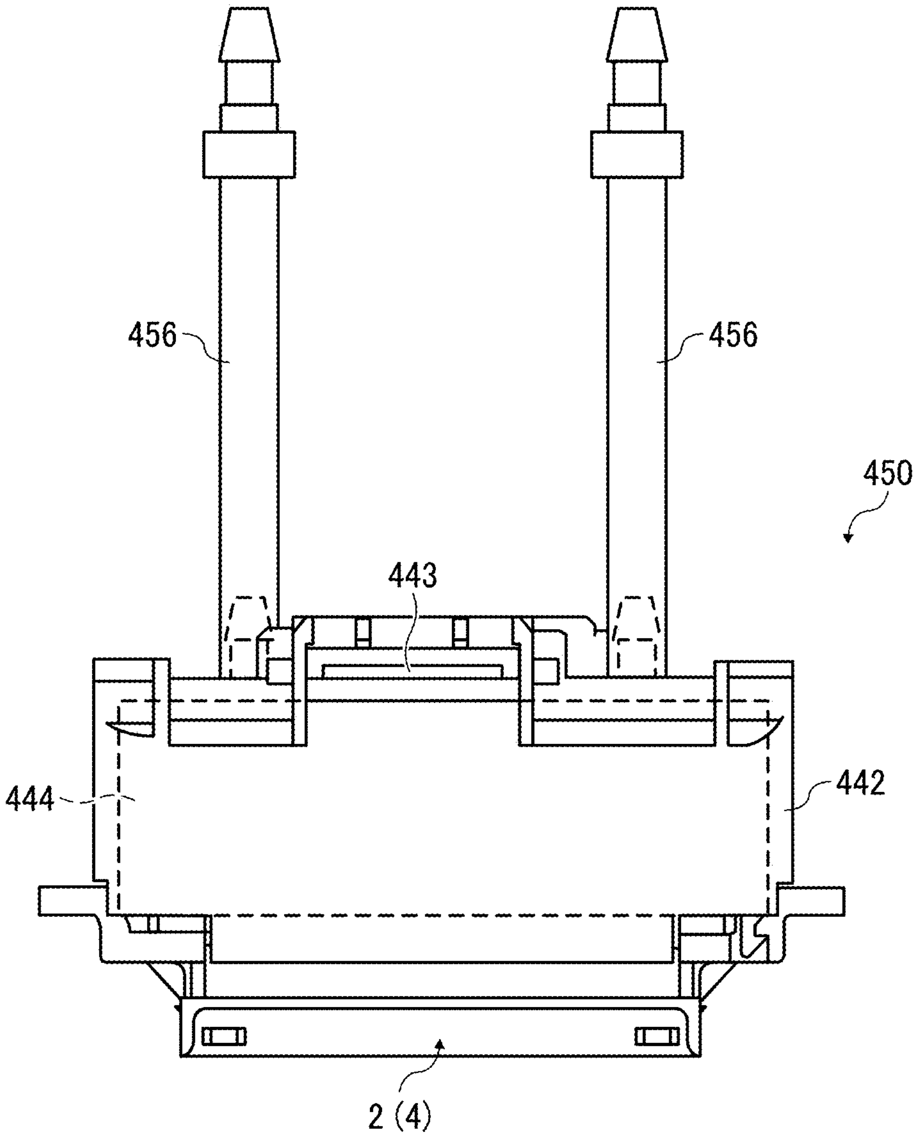
FIG. 25 is a front explanatory view of an example of the liquid discharge device.

A liquid discharge device 450 illustrated in FIG. 25 includes a liquid discharge head 1 to which a channel component 444 is attached and a tube 456 connected to the channel component 444. The channel component 444 is disposed in a cover 442, and a connector 443 that makes electrical connection with the liquid discharge head 1 is provided on the upper part of the channel component 444. Instead of the channel component 444, the head tank 441 can also be included.

In the liquid discharge devices 100, 100A, 100B, 440, and 450 including the liquid discharge head 1 described above, and the printers 400 and 500 that serve as the liquid discharge apparatus, it is possible to obtain operational effects similar to those of the liquid discharge head 1 described above.

In the present embodiment, liquid to be used is not particularly limited as long as the liquid has a viscosity and surface tension of degrees dischargeable from the head. Preferably, the viscosity of the liquid is 30 mPa·s or less under ordinary temperature and ordinary pressure or by heating or cooling. More specific examples of the liquid include a solution, a suspension, or an emulsion that contains, for example, a solvent such as water or an organic solvent, a colorant such as a dye or a pigment, a functional material such as a polymerizable compound, a resin, or a surfactant, a biocompatible material such as DNA, amino acid, protein, or calcium, or an edible material such as a natural colorant. These can be used for, for example, inkjet ink, a surface treatment solution, a material solution for three-dimensional modeling, and the like.

Examples of a source to generate energy to discharge liquid include a piezoelectric actuator (a laminated piezoelectric element and a thin-film piezoelectric element), a thermal actuator that employs a thermoelectric conversion element such as a thermal resistor, and an electrostatic actuator including a diaphragm and opposed electrodes.

The term "liquid discharge device" represents a structure including the liquid discharge head and a functional component or mechanism combined to the liquid discharge head to form a single unit. The liquid discharge device includes an assembly of components relating to liquid discharge. For example, the "liquid discharge device" includes a combination of the liquid discharge head with at least one of a head tank, a carriage, a supply mechanism, a maintenance recovery mechanism, a main scanning moving mechanism, and a liquid circulation apparatus.

Here, examples of the integration include a form in which a liquid discharge head and a functional component or mechanism are secured to each other by fastening, bonding, engaging, or the like, and a form in which one is held movably with respect to the other. The liquid discharge head and the functional component or mechanism may be detachable from each other.

Examples of the liquid discharge device include a unit in which a liquid discharge head and a head tank are integrated with each other, and a unit in which the liquid discharge head and the head tank are connected to each other by a tube or the like to be integrated. Here, it is also possible to add a unit including a filter between the liquid discharge head and the head tank of the liquid discharge device thereof.

Examples of the liquid discharge device include a unit in which a liquid discharge head is integrated with a carriage, and a unit in which a liquid discharge head, a carriage, and a main scanning moving mechanism are integrated with each other. Another example of the liquid discharge device includes a unit in which a liquid discharge head is movably held by a guide member constituting a part of a scanning moving mechanism and the liquid discharge head is integrated with the scanning moving mechanism.

Still another example of the liquid discharge device includes a unit in which a cap member that serves as a part of a maintenance recovery mechanism is secured to a carriage to which a liquid discharge head is attached to integrate the liquid discharge head, the carriage, and the maintenance recovery mechanism with each other. Yet still another example of the liquid discharge device includes a unit in which a tube is coupled to a liquid discharge head to which a head tank or a channel component is attached to integrate the liquid discharge head and a supply mechanism with each other. Liquid in a liquid reservoir source such as an ink cartridge is supplied to the head through this tube.

The main scanning moving mechanism also includes a single guide member. The supply mechanism also includes a single tube and a single loading unit.

In the present embodiment, the liquid discharge device is described in combination with the liquid discharge head, but the liquid discharge device includes a unit in which a head module or a head unit including the above-described liquid discharge head, and the above-described functional component or mechanism are integrated with each other.

The liquid discharge apparatus includes an apparatus that includes a liquid discharge head, a liquid discharge device, a head module, a head unit, and the like, and drives the liquid discharge head to discharge liquid. The liquid discharge apparatus includes not only an apparatus that can discharges liquid onto a liquid-attachable object but also an apparatus that discharges liquid toward gas or liquid.

The liquid discharge apparatus may also include a unit related to feeding, conveying, or paper ejection of a liquid-attachable object, a pretreatment device, a post-treatment device, and the like. Examples of the liquid discharge apparatus include an image forming apparatus that discharges ink to form an image on a recording medium, and a stereoscopic modeling apparatus (three-dimensional modeling apparatus) that discharges modeling liquid onto a powder layer obtained by forming powder into a layer shape in order to model a stereoscopic modeled object (three-dimensional modeled object).

The liquid discharge apparatus is not limited to an apparatus in which a significant image such as a letter or a figure is visualized by discharged liquid. Examples of the liquid discharge apparatus include an apparatus that forms a pattern or the like having no meaning by itself and an apparatus that models a three-dimensional image.

The above-described liquid-attachable object means an object to which liquid can be attached at least temporarily, and means an object causing fastness by attachment, an object causing permeation by attachment, or the like. Specific examples of the liquid-attachable object include a recording medium such as a paper sheet, a film, or a cloth, an electronic component such as an electronic substrate or a piezoelectric element, and a medium such as a powder layer, an organ model, or a test cell. Unless particularly limited, the liquid-attachable object includes everything to which liquid is attached. The material of the liquid-attachable object may be any material as long as liquid can be attached to the object even temporarily, for example, paper, yarn, fiber, cloth, leather, metal, plastic, glass, wood, ceramics.

The liquid discharge apparatus includes an apparatus in which a liquid discharge head and a liquid-attachable object move relatively to each other, but the moving object is not limited to any one thereof. Specific examples thereof include a serial type apparatus that moves a liquid discharge head and a line type apparatus that does not move a liquid discharge head.

Another example of the liquid discharge apparatus includes a treatment liquid application apparatus that discharges treatment liquid onto the surface of a paper sheet in order to apply the treatment liquid to the surface of the paper sheet, for example, in order to modify the surface of the paper sheet, and a spraying granulation apparatus that sprays composition liquid in which a raw material is dispersed in a solution via a nozzle to granulate fine particles of the raw material.

Although the preferred embodiments of the present embodiment have been described above, the present embodiment is not limited to such specific embodiments, and various modifications and changes can be made within the scope of the gist of the present embodiment described in the claims unless otherwise limited in the above description. The effects described in the embodiments of the present embodiment are merely examples of the most suitable effects generated from the present embodiment, and the effects of the present embodiment are not limited to those described in the embodiment of the present embodiment.

According to the present embodiment, damage to the damper can be suppressed.

The above description is an example, and specific effects are exhibited for each of the following aspects.

[First Aspect]

A first aspect is a liquid discharge head 1 configured to drive an electromechanical transducer (for example, a piezoelectric element 40) held by an actuator substrate (for example, a piezoelectric element holding substrate 70) to discharge liquid (for example, ink) in a pressure chamber 21 from a nozzle 11. The liquid discharge head 1 includes a damper (for example, a damper plate 66) disposed between the actuator substrate and a damper holding substrate (for example, a damper frame substrate 65). The damper is joined to one of the actuator substrate and the damper holding substrate with an adhesive 90. When an object to which the damper is joined is a substrate to be joined (for example, a common channel member 50 of the piezoelectric element holding substrate 70 that serves as the actuator substrate), the damper has a recess or a through hole 66*a* formed in a facing region facing a bonding surface of the substrate to be joined.

In a conventional liquid discharge head, a damper may be bonded to an actuator substrate or a damper holding substrate with an adhesive. In this case, a filler contained in the adhesive and a foreign matter (scraps, fragments, and the like generated in a manufacturing process) mixed from the outside may be interposed between the damper and the substrate (substrate to be joined) bonded to the damper with the adhesive among the actuator substrate and the damper holding substrate. When the filler and the foreign matter are interposed, the filler and the foreign matter are sandwiched between the damper and the substrate to be joined, and local stress acts on the damper, which may cause the damper to be damaged, for example, broken (cracked).

In the damper according to the present aspect, the recess or the through hole is formed in the facing region facing the bonding surface of the substrate to be joined. According to this, even the filler and the foreign matter which may be sandwiched between the substrate to be joined and the damper in which the recess or the through hole is not formed can enter the recess or the through hole to be prevented from being sandwiched between the damper and the substrate to be joined. Therefore, the probability that the filler and the foreign matter are sandwiched between the damper and the substrate to be joined can be reduced, whereby damage to the damper can be suppressed.

[Second Aspect]

A second aspect is a liquid discharge head 1 configured to drive an electromechanical transducer (for example, a piezoelectric element 40) held by an actuator substrate (for example, a piezoelectric element holding substrate 70) to discharge liquid (for example, ink) in a pressure chamber 21 from a nozzle 11. The liquid discharge head 1 includes: a damper (for example, a damper plate 66) disposed between the actuator substrate and a damper holding substrate (for example, a damper frame substrate 65); and an adhesive 90 for bonding a substrate to be joined (for example, a common channel member 50 of the piezoelectric element holding substrate 70 that serves as the actuator substrate), which is one of the actuator substrate and the damper holding substrate, and the damper. In the substrate to be joined, a recessed portion 59*a* is formed in a facing region facing a bonding surface of the damper.

In the substrate to be joined according to the present aspect, the recessed portion is formed in the facing region facing the bonding surface of the damper, whereby even the filler and the foreign matter which may be sandwiched between the substrate to be joined in which the recessed portion is not formed and the damper can enter the recessed portion to be prevented from being sandwiched between the damper and the substrate to be joined. Therefore, the probability that the filler and the foreign matter are sandwiched between the damper and the substrate to be joined can be reduced, whereby damage to the damper can be suppressed.

[Third Aspect]

According to a third aspect, in the first aspect, in the substrate to be joined, the recessed portion 59*a* is formed in a facing region facing a bonding surface portion in which the recess or the through hole of the damper is not formed.

In the substrate to be joined according to the present aspect, the recessed portion is formed in the facing region facing the bonding surface of the damper, whereby even the filler and the foreign matter which may be sandwiched between the substrate to be joined in which the recessed portion is not formed and the damper can enter the recessed portion to be prevented from being sandwiched between the damper and the substrate to be joined. Therefore, the probability that the filler and the foreign matter are sandwiched between the damper and the substrate to be joined can be reduced, whereby damage to the damper can be suppressed.

[Fourth Aspect]

According to a fourth aspect, in the third aspect, the recessed portion extends to a region facing the recess or the through hole of the damper.

This makes it possible to reduce a portion where the distance between the substrate to be joined and the damper becomes the shortest, and to further reduce the probability that the filler and the foreign matter are sandwiched between the damper and the substrate to be joined. Therefore, damage to the damper can be further suppressed.

[Fifth Aspect]

According to a fifth aspect, in the first, third, or fourth aspect, a recessed portion 69*a* is formed in the facing region facing the through hole of the damper in the other substrate (for example, the damper frame substrate 65) of the actuator substrate and the damper holding substrate.

According to this, the adhesive can also enter the recessed portion of the other substrate through the through hole of the damper. Therefore, the bonding area between a joined member formed by joining the other substrate and the damper to each other and the adhesive is increased, and the bonding strength between the joined member and the substrate to be joined can be further enhanced.

[Sixth Aspect]

According to a sixth aspect, in the fifth aspect, an opening area of the through hole is larger than an opening area of the recessed portion of the other substrate.

According to this, a step is generated between the through hole of the damper and the recessed portion of the other substrate, and the bonding area is further increased, whereby higher bonding strength can be realized.

[Seventh Aspect]

According to a seventh aspect, in any one of the first to sixth aspects, the adhesive contains a filler.

The present aspect makes it possible to suppress damage to the damper due to the filler even w % ben the filler is contained in the adhesive for the purpose of improving adhesiveness or improving bonding strength.

[Eighth Aspect]

According to an eighth aspect, in the seventh aspect, a thickness of the damper is larger than a maximum diameter of the filler.

The present aspect makes it possible to suppress damage to the damper due to the filler.

[Ninth Aspect]

According to a ninth aspect, in any one of the first to eighth aspects, the recess or the through hole of the damper includes an opening having a linear shape, a circular shape, or a polygonal shape along a substrate surface of the damper holding substrate.

This makes it possible to appropriately select the opening shape of the recess or the through hole of the damper.

[Tenth Aspect]

According to a tenth aspect, in any one of the first to ninth aspects, the recess or the through hole of the damper is formed so as to surround a damper portion in which the recess or the through hole is not formed in the facing region facing the bonding surface of the substrate to be joined.

According to this, the excess of the adhesive for bonding the damper portion in which the recess or the through hole is not formed is taken into the recess or the through hole of the damper, whereby the excess of the adhesive hardly protrudes to the outside of the bonding surface of the substrate to be joined.

[Eleventh Aspect]

According to an eleventh aspect, in any one of the first to tenth aspects, the recess or the through hole of the damper has a tapered shape tapered in a depth direction.

According to this, the filler and the foreign matter easily enter a further inner or deeper portion of the recess or the through hole of the damper, which makes it possible to further reduce the risk of damage to the damper.

[Twelfth Aspect]

According to a twelfth aspect, in any one of the first to eleventh aspects, the damper has a compliance of $7\times10^{-17}$ [m/N] or more, a Young's modulus of 3 [GPa] or more and 200 [GPa] or less, and a thickness of 2 [μm] or more and 10 [μm] or less.

This makes it possible to sufficiently satisfy a function necessary as the damper.

[Thirteenth Aspect]

According to a thirteenth aspect, in any one of the first to twelfth aspects, the damper has a laminated structure including a plurality of layers.

This makes it easy to adjust damper characteristics.

[Fourteenth Aspect]

A fourteenth aspect is a liquid discharge device including the liquid discharge head according to any one of the first to thirteenth aspects.

According to the present aspect, it is possible to provide the liquid discharge device in which damage to the damper of the liquid discharge head is suppressed.

[Fifteenth Aspect]

A fifteenth aspect is a liquid discharge apparatus including the liquid discharge head according to any one of the first to thirteenth aspects or the liquid discharge device according to the fourteenth aspect.

[Aspect 1]

A liquid discharge head includes: an actuator substrate; an electromechanical transducer held by the actuator substrate; a damper; and a damper holding substrate holding the damper, wherein the damper disposed between the actuator substrate and the damper holding substrate and joined to the actuator substrate and the damper holding substrate with an adhesive, the damper has a joint portion having a recess or a through hole.

[Aspect 2]

In the liquid discharge head according to aspect 1, one of the actuator substrate and the damper holding substrate has a first recessed portion in a first facing region facing the joint portion of the damper.

[Aspect 3]

In the liquid discharge head according to aspect 2, another of the actuator substrate and the damper holding substrate has a second recessed portion in a non-facing region not facing the joint portion of the damper.

[Aspect 4]

In the liquid discharge head according to aspect 3, the second recessed portion extends to a second facing region facing the joint portion of the damper.

[Aspect 5]

In the liquid discharge head according to aspect 2, an opening area of the through hole of the damper is larger than an area of the first recessed portion of said one of the actuator substrate and the damper holding substrate in a plane direction of the damper.

[Aspect 6]

In the liquid discharge head according to aspect 1, the adhesive contains a filler.

[Aspect 7]

In the liquid discharge head according to aspect 6, a thickness of the damper is larger than a maximum diameter of the filler.

[Aspect 8]

In the liquid discharge head according to aspect 1, the recess or the through hole of the damper has a linear shape, a circular shape, or a polygonal shape in a plane direction of the damper.

[Aspect 9]

In the liquid discharge head according to aspect 1, the damper includes: an island portion bonded to the actuator substrate with the adhesive; and a surrounding portion surrounding the island portion, the surrounding portion includes the recess or the through hole.

[Aspect 10]

In the liquid discharge head according to aspect 1, the recess or the through hole of the damper has a tapered shape, an opening area of which decreases toward the damper holding substrate in a thickness direction of the damper.

[Aspect 11]

In the liquid discharge head according to aspect 1, the damper has: a compliance of 7×10-17 [m/N or more, a Young's modulus of 3 GPa] or more and 200 [GPa] or less, and a thickness of 2 [μm] or more and 10 [μm] or less.

[Aspect 12]

In the liquid discharge head according to aspect 1, the damper includes multiple layers laminated in a thickness direction of the damper.

[Aspect 13]

A liquid discharge device comprising multiple liquid discharge heads including the liquid discharge head according to aspect 1.

[Aspect 14]

A liquid discharge apparatus includes: the liquid discharge head according to aspect 1; and a conveyor configured to convey a medium onto which a liquid is discharged from the liquid discharge head.

[Aspect 15]

A liquid discharge head includes: an actuator substrate; an electromechanical transducer held by the actuator substrate; a damper; and a damper holding substrate holding the damper, wherein the damper disposed between the actuator substrate and the damper holding substrate and joined to the actuator substrate and the damper holding substrate with an adhesive, the actuator substrate includes a recess in a facing region facing the damper.

According to the present aspect, it is possible to provide the liquid discharge apparatus in which damage to the damper of the liquid discharge head is suppressed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

an actuator substrate;

an electromechanical transducer held by the actuator substrate;

a damper; and a damper holding substrate holding the damper, wherein the damper is disposed between the actuator substrate and the damper holding substrate and is joined to the actuator substrate and the damper holding substrate with an adhesive, and wherein the damper has a joint portion having a recess or a through hole.

2. The liquid discharge head according to claim 1, wherein one of the actuator substrate and the damper holding substrate has a first recessed portion in a first facing region facing the joint portion of the damper.

3. The liquid discharge head according to claim 2, wherein another of the actuator substrate and the damper holding substrate has a second recessed portion in a non-facing region not facing the joint portion of the damper.

4. The liquid discharge head according to claim 3, wherein the second recessed portion extends to a second facing region facing the joint portion of the damper.

5. The liquid discharge head according to claim 2, wherein an opening area of the through hole of the damper is larger than an area of the first recessed portion of said one of the actuator substrate and the damper holding substrate in a plane direction of the damper.

6. The liquid discharge head according to claim 1, wherein the adhesive contains a filler.

7. The liquid discharge head according to claim 6, wherein a thickness of the damper is larger than a maximum diameter of the filler.

8. The liquid discharge head according to claim 1, wherein the recess or the through hole of the damper has a linear shape, a circular shape, or a polygonal shape in a plane direction of the damper.

9. The liquid discharge head according to claim 1, wherein the damper includes:

an island portion bonded to the actuator substrate with the adhesive; and a surrounding portion surrounding the island portion, the surrounding portion includes the recess or the through hole.

10. The liquid discharge head according to claim 1, wherein the recess or the through hole of the damper has a tapered shape, an opening area of which decreases toward the damper holding substrate in a thickness direction of the damper.

11. The liquid discharge head according to claim 1, wherein the damper has:

a compliance of 7×10−17 [m/N] or more, a Young's modulus of 3 [GPa] or more and 200 [GPa] or less, and a thickness of 2 [μm] or more and 10 [μm] or less.

12. The liquid discharge head according to claim 1, wherein the damper includes multiple layers laminated in a thickness direction of the damper.

13. A liquid discharge device comprising multiple liquid discharge heads including the liquid discharge head according to claim 1.

14. A liquid discharge apparatus comprising:

the liquid discharge head according to claim 1; and a conveyor configured to convey a medium onto which a liquid is discharged from the liquid discharge head.

15. The liquid discharge head according to claim 1, wherein:

the joint portion includes the through hole, and the damper holding substrate has a first recessed portion in a first facing region facing the joint portion of the damper, the first recessed portion extending partially into the damper holding substrate and being aligned with the through hole of the joint portion.

16. A liquid discharge head comprising:

an actuator substrate;

an electromechanical transducer held by the actuator substrate;

a damper; and a damper holding substrate holding the damper, wherein the damper is disposed between the actuator substrate and the damper holding substrate and is joined to the actuator substrate and the damper holding substrate with an adhesive, and wherein the actuator substrate includes a recess in a facing region facing the damper.

17. A liquid discharge bead comprising:

an actuator substrate;

an electromechanical transducer held by the actuator substrate;

a damper; and a damper holding substrate holding the damper, wherein the damper is disposed between the actuator substrate and the damper holding substrate and is joined to the actuator substrate and the damper holding substrate with an adhesive, wherein the damper has a joint portion having a recess or a through hole, wherein one of the actuator substrate and the damper holding substrate has a first recessed portion in a first facing region facing the joint portion of the damper, and wherein another of the actuator substrate and the damper holding substrate has a second recessed portion in a non-facing region not facing the joint portion of the damper.

* * * * *